United States Patent (10) Patent No.: US 12,289,154 B2
Stavridis et al. (45) Date of Patent: Apr. 29, 2025

(54) METHODS, APPARATUS AND MACHINE-READABLE MEDIUMS RELATED TO WIRELESS ACCESS IN COMMUNICATION NETWORKS

(71) Applicant: Telefonaktiebolaget LM Ericsson (publ), Stockholm (SE)

(72) Inventors: Athanasios Stavridis, Malmö (SE); Leif Wilhelmsson, Lund (SE); Miguel Lopez, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/098,407

(22) Filed: Jan. 18, 2023

(65) Prior Publication Data

US 2023/0155664 A1 May 18, 2023

Related U.S. Application Data

(63) Continuation of application No. 17/414,627, filed as application No. PCT/EP2018/086612 on Dec. 21, 2018, now Pat. No. 11,563,478.

(51) Int. Cl.
H04B 7/06 (2006.01)
H04B 7/08 (2006.01)

(52) U.S. Cl.
CPC ........... H04B 7/0695 (2013.01); H04B 7/088 (2013.01)

(58) Field of Classification Search
CPC .............................. H04B 7/0695; H04B 7/088
See application file for complete search history.

(56) References Cited

U.S. PATENT DOCUMENTS 6,842,439 B2 1/2005 Zeitfuss
9,143,230 B2 9/2015 Casaccia et al.
(Continued)

FOREIGN PATENT DOCUMENTS

CN 103237292 B 8/2013
CN 104202088 A 12/2014
(Continued)

OTHER PUBLICATIONS

Grobe, L., et al., "Block-Based PAM with Frequency Domain Equalization in Visible Light Communications", 2013 EEE, Globecom 2013 Workshop—Optical Wireless Communications, Dec. 9-13, 2013, pp. 1070-1075, Atlanta, GA.
(Continued)

Primary Examiner — Jaison Joseph
(74) Attorney, Agent, or Firm — COATS & BENNETT, PLLC

(57) ABSTRACT

Methods, apparatus and non-transitory machine-readable mediums are provided for wireless access in communications networks comprising radio access network nodes and wireless light communication network nodes. In one embodiment, a method is performed by a radio access network node for selecting a transmit or receive beam for communication with a wireless device in a communication network. The radio access network node comprises a plurality of antenna elements configurable to provide a plurality of transmit or receive beams. The communication network further comprises one or more wireless light communication, LC, network nodes. The method comprises: obtaining information identifying a wireless LC network node to which the wireless device is connected; based on the identified wireless LC network node, selecting a subset of the plurality of transmit or receive beams; and initiating a beam-sweeping procedure using the subset of transmit or
(Continued)

receive beams to select a transmit or receive beam for communication with the wireless device.

9 Claims, 13 Drawing Sheets

(56) References Cited

U.S. PATENT DOCUMENTS

| | | | |
|---|---|---|---|
| 9,391,699 | B2 | 7/2016 | Jovicic et al. |
| 9,629,171 | B2 | 4/2017 | Roy et al. |
| 10,165,483 | B1 | 12/2018 | Liu et al. |
| 10,260,570 | B2 | 4/2019 | Takabayashi et al. |
| 10,292,086 | B2 | 5/2019 | Serita et al. |
| 10,356,789 | B2 | 7/2019 | Raghavan et al. |
| 10,778,330 | B1* | 9/2020 | Zoller .................. H04B 10/27 |
| 11,700,560 | B2 | 7/2023 | Shiina et al. |
| 2003/0231584 | A1 | 12/2003 | Zeitfuss |
| 2005/0238172 | A1 | 10/2005 | Tamura |
| 2008/0032709 | A1 | 2/2008 | Guvenc et al. |
| 2014/0153923 | A1 | 6/2014 | Casaccia et al. |
| 2014/0218236 | A1 | 8/2014 | Sadeghi et al. |
| 2014/0226977 | A1 | 8/2014 | Jovicic et al. |
| 2015/0208459 | A1 | 7/2015 | Kitagawa et al. |
| 2015/0230263 | A1 | 8/2015 | Roy et al. |
| 2015/0318922 | A1* | 11/2015 | Poola .................. H05B 45/10 398/45 |
| 2016/0149302 | A1 | 5/2016 | Sanderovich et al. |
| 2016/0198474 | A1 | 7/2016 | Raghavan et al. |
| 2016/0323801 | A1 | 11/2016 | Serita et al. |
| 2017/0041072 | A1* | 2/2017 | Rong .................. H04B 10/116 |
| 2017/0047994 | A1* | 2/2017 | Logvinov .............. H04W 4/80 |
| 2017/0132852 | A1 | 5/2017 | Morita et al. |
| 2017/0202029 | A1* | 7/2017 | Qi ........................ H04W 56/001 |
| 2017/0207851 | A1* | 7/2017 | Zeng .................. H04B 10/116 |
| 2017/0223810 | A1 | 8/2017 | Bernsen et al. |
| 2017/0302355 | A1 | 10/2017 | Islam et al. |
| 2018/0132116 | A1 | 5/2018 | Shekhar et al. |
| 2018/0219587 | A1* | 8/2018 | Huo ........................ H04B 1/40 |
| 2018/0254826 | A1 | 9/2018 | Jungnickel et al. |
| 2018/0279202 | A1* | 9/2018 | Tenny .................. H04W 40/22 |
| 2019/0020413 | A1* | 1/2019 | Park .................... H04W 76/16 |
| 2019/0110234 | A1 | 4/2019 | Peisa et al. |
| 2019/0158166 | A1 | 5/2019 | Takano |
| 2019/0229789 | A1* | 7/2019 | Zhang .................. H04B 7/0617 |
| 2019/0319686 | A1* | 10/2019 | Chen, IV ............. H04B 7/0639 |
| 2020/0177277 | A1* | 6/2020 | Seyvet ................ H04B 10/116 |
| 2020/0191575 | A1* | 6/2020 | Narendra ................ G01S 11/08 |
| 2020/0403687 | A1* | 12/2020 | Raghavan ......... H04W 74/0833 |
| 2021/0067247 | A1 | 3/2021 | Liverman et al. |
| 2022/0164492 | A1* | 5/2022 | Santarone ............... G06F 30/13 |
| 2023/0083292 | A1 | 3/2023 | Berner et al. |
| 2023/0155664 | A1* | 5/2023 | Stavridis ............. H04B 7/0695 375/299 |

FOREIGN PATENT DOCUMENTS

| | | |
|---|---|---|
| CN | 103259592 B | 5/2016 |
| CN | 106656326 A | 5/2017 |
| CO | 15111422 | 5/2015 |
| EP | 2926478 B1 | 2/2017 |
| EP | 3236594 A2 | 10/2017 |
| EP | 3689026 B1 | 5/2022 |
| GB | 632375 A | 11/1949 |
| JP | 200059382 A | 2/2000 |
| JP | 2001250129 A | 9/2001 |
| JP | 2004364179 A | 12/2004 |
| JP | 2005529570 A | 9/2005 |
| JP | 2005311653 A | 11/2005 |
| JP | 2007307494 A | 11/2007 |
| JP | 4329965 B2 | 9/2009 |
| JP | 2012204955 A | 10/2012 |
| JP | 201414047 A | 1/2014 |
| JP | 5965931 B2 | 9/2014 |
| JP | 2014169785 A | 9/2014 |
| JP | 2015527026 A | 9/2015 |
| JP | 2016504840 A | 2/2016 |
| JP | 2016511997 A | 4/2016 |
| JP | 2017005579 A | 1/2017 |
| JP | 2017092676 A | 5/2017 |
| JP | 2017528962 A | 9/2017 |
| JP | 2018506218 A | 3/2018 |
| JP | 2019500771 A | 1/2019 |
| JP | 2020502883 A | 1/2020 |
| KR | 20130093831 A | 8/2013 |
| TW | 201620257 A | 6/2016 |
| WO | 2014036150 A1 | 3/2014 |
| WO | 2014062714 A1 | 4/2014 |
| WO | 2015086079 A1 | 6/2015 |
| WO | 2015098311 A1 | 7/2015 |
| WO | 2015104802 A1 | 7/2015 |
| WO | 2016180497 A1 | 11/2016 |
| WO | 2017081207 A1 | 5/2017 |
| WO | 2017125747 A1 | 7/2017 |
| WO | 2017171901 A1 | 10/2017 |
| WO | 2017184190 A1 | 10/2017 |
| WO | 2018083649 A1 | 5/2018 |

OTHER PUBLICATIONS

Kahn, J., et al., "Wireless Infrared Communications", Proceedings of the IEEE, Feb. 1, 1997, pp. 265-298, vol. 85, No. 2.

Komine, T., et al., "Fundamental Analysis for Visible-Light Communication System using LED Lights", IEEE Transactions on Consumer Electronics, Feb. 1, 2004, pp. 100-107, vol. 50, No. 1.

Tsonev, D., et al., "Complete Modeling of Nonlinear Distortion in OFDM-Based Optical Wireless Communication", Journal of Lightwave Technology, Sep. 15, 2013, pp. 3064-3076, vol. 31, No. 18.

Zhou, Z. et al., "Wifi-Based Indoor Line-of-Sight Identification", IEEE Transactions on Wireless Communications, vol. 14 No. 11, Nov. 2015, pp. 6125-6136, IEEE.

Wu, Z. et al., "Network solutions for the line-of-sight problem of new multi-user indoor free-space optical system", ET Communications, vol. 6 Issue 5, Jan. 2011, pp. 525-531, www.ietdl.org.

Silva, B. et al., "IR-UWB-Based Non-Line-of-Sight Identification in Harsh Environments: Principles and Challenges", IEEE Transactions on Industrial Informatics, vol. 12 No. 3, Jun. 2016, pp. 1188-1195, IEEE.

Benedetto, F. et al., "Dynamic LOS/NLOS Statistical Discrimination of Wireless Mobile Channels", 65th Vehicular Technology Conference—VTC2007-Spring, Apr. 22-25, 2007, pp. 3071-3075, IEEE.

Borràs, J. et al., "Decision Theoretic Framework for NLOS Identification", VTC '98 48th Vehicular Technology Conference, Pathway to Global Wireless Revolution, May 21, 1998, pp. 1583-1587, IEEE.

\* cited by examiner

METHODS, APPARATUS AND MACHINE-READABLE MEDIUMS RELATED TO WIRELESS ACCESS IN COMMUNICATION NETWORKS

RELATED APPLICATIONS

The present application is a continuation of U.S. patent application Ser. No. 17/414,627 filed on Jun. 16, 2021, which is a national stage application of PCT/EP2018/086612 filed Dec. 21, 2018, the disclosures of each of which are incorporated herein by reference in their entirety.

TECHNICAL FIELD

Embodiments of the disclosure relate to wireless access in communication networks, and particularly relate to methods, apparatus and machine-readable mediums for wireless access in communication networks comprising radio access network nodes and wireless light communication network nodes.

BACKGROUND

Transmission points for wireless radio communication networks are increasingly being equipped with advanced antenna systems. These antenna systems increase the capacity and/or coverage of existing wireless systems by the addition of antenna arrays. This enables the use of beamforming techniques to increase the received signal strength for signals transmitted in and received from a particular direction. Wireless devices are similarly being provided with multi-antenna transceivers. Thus, they are also able to apply beamforming techniques to benefit from beamforming gain in particular directions both for transmitted and received signals.

In order to benefit from beamforming gains, therefore, a transmitting device, whether an Access Point (AP) or a wireless device, should determine an appropriate transmit beam (e.g., shape and/or direction) so as to transmit beams with higher gain in the direction of the receiving device. Similarly, a receiving device, whether an AP or a wireless device, should determine an appropriate receive beam (e.g., shape and/or direction) so as to receive beams with higher gain in the direction of the transmitting device.

This outcome is usually achieved through a process known as beamsweeping, in which the transmitting device transmits beams in all predefined directions, e.g., in a burst and/or at a regular interval. The receiving device performs measurements on those beams using all of its receiving beams, and reports the measurements to the transmitting device so that an appropriate transmit-receive beam pair can be determined. To be certain that the most appropriate beam pair is chosen, transmissions and corresponding measurements are performed for all possible transmit-receive beam pairs.

This selection of transmit-receive beam pairs may be performed as part of several different processes in the network. For example, the transmit-receive beam pair may be determined in the initial system access to the wireless radio communication network, during handover from one radio access point to another, after radio beam link failure, and/or during an on-going connection (e.g., to ensure that the optimal beam pair continues to be used over time). In the latter case, the beam pair may be re-determined periodically, or on an event-driven basis (e.g., in response to received signal quality or strength falling below a threshold).

To be certain that the most appropriate beam pair is chosen, transmissions and corresponding measurements are performed for all possible transmit-receive beam pairs. This can take a considerable amount of time, and involve considerable signalling overhead in the network. If the process could be made quicker or more efficient, radio resources would be freed up for other devices attempting to access the network.

SUMMARY

Embodiments of the present disclosure seek to address these and other problems.

In one aspect, there is provided a method performed by a radio access network node for selecting a transmit or receive beam for communication with a wireless device in a communication network. The radio access network node comprises a plurality of antenna elements configurable to provide a plurality of transmit or receive beams. The communication network further comprises one or more wireless light communication, LC, network nodes. The method comprises: obtaining information identifying a wireless LC network node to which the wireless device is connected; based on the identified wireless LC network node, selecting a subset of the plurality of transmit or receive beams; and initiating a beam-sweeping procedure using the subset of transmit or receive beams to select a transmit or receive beam for communication with the wireless device.

Apparatus and non-transitory machine-readable mediums are also provided for performing the method set out above. For example, in one aspect, a radio access network node is provided, configured to perform the method (and other methods set out herein). In another aspect, there is provided a radio access network node, for selecting a transmit or receive beam for communication with a wireless device in a communication network. The communication network further comprises one or more wireless light communication, LC, network nodes. The radio access network node comprises processing circuitry, a non-transitory machine-readable medium and a plurality of antenna elements configurable to provide a plurality of transmit or receive beams. The non-transitory machine-readable medium stores instructions which, when executed by the processing circuitry, cause the radio access network node to: obtain information identifying a wireless LC network node to which the wireless device is connected; based on the identified wireless LC network node, select a subset of the plurality of transmit or receive beams; and initiate a beam-sweeping procedure using the subset of transmit or receive beams to select a transmit or receive beam for communication with the wireless device.

In another aspect, there is provided a method performed by a wireless device for selecting a transmit or receive beam for communication with a radio access network node in a communication network. The wireless device comprises a plurality of antenna elements configurable to provide a plurality of transmit or receive beams. The communication network further comprises one or more wireless light communication, LC, network nodes. The method comprises: connecting to a wireless LC network node; based on the wireless LC network node to which the wireless device is connected, selecting a subset of the plurality of transmit or receive beams; and performing a beam-sweeping procedure using the subset of transmit or receive beams to select a transmit or receive beam for communication with the radio access network node.

Apparatus and non-transitory machine-readable mediums are also provided for performing the method set out above.

For example, in one aspect, a wireless device is provided, configured to perform the method (and other methods set out herein). In another aspect, there is provided a wireless device, for selecting a transmit or receive beam for communication with a radio access network node in a communication network. The communication network further comprises one or more wireless light communication, LC, network nodes. The wireless device comprises processing circuitry, a non-transitory machine-readable medium and a plurality of antenna elements configurable to provide a plurality of transmit or receive beams. The non-transitory machine-readable medium stores instructions which, when executed by the processing circuitry, cause the wireless device to: connect to a wireless LC network node; based on the wireless LC network node to which the wireless device is connected, select a subset of the plurality of transmit or receive beams; and perform a beam-sweeping procedure using the subset of transmit or receive beams to select a transmit or receive beam for communication with the radio access network node.

A further aspect provides a method performed by a wireless light communication (LC) network node in a communication network. The communication network further comprises one or more radio access network nodes, each radio access network node forming a respective radio cell. The method comprises: establishing a wireless LC connection with a wireless device; and transmitting, to a radio access network node, an information message comprising an indication that the wireless device is connected to the wireless LC network node.

Apparatus and non-transitory machine-readable mediums are also provided for performing the method set out above. For example, in one aspect, a wireless LC network node is provided, configured to perform the method (and other methods set out herein). In another aspect, there is provided a wireless light communication (LC) network node in a communication network. The communication network further comprises one or more radio access network nodes, each radio access network node forming a respective radio cell. The wireless LC network node comprises processing circuitry and a non-transitory machine-readable medium storing instructions which, when executed by the processing circuitry, cause the wireless LC network node to: establish a wireless LC connection with a wireless device; and transmit, to a radio access network node, an information message comprising an indication that the wireless device is connected to the wireless LC network node.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1A:
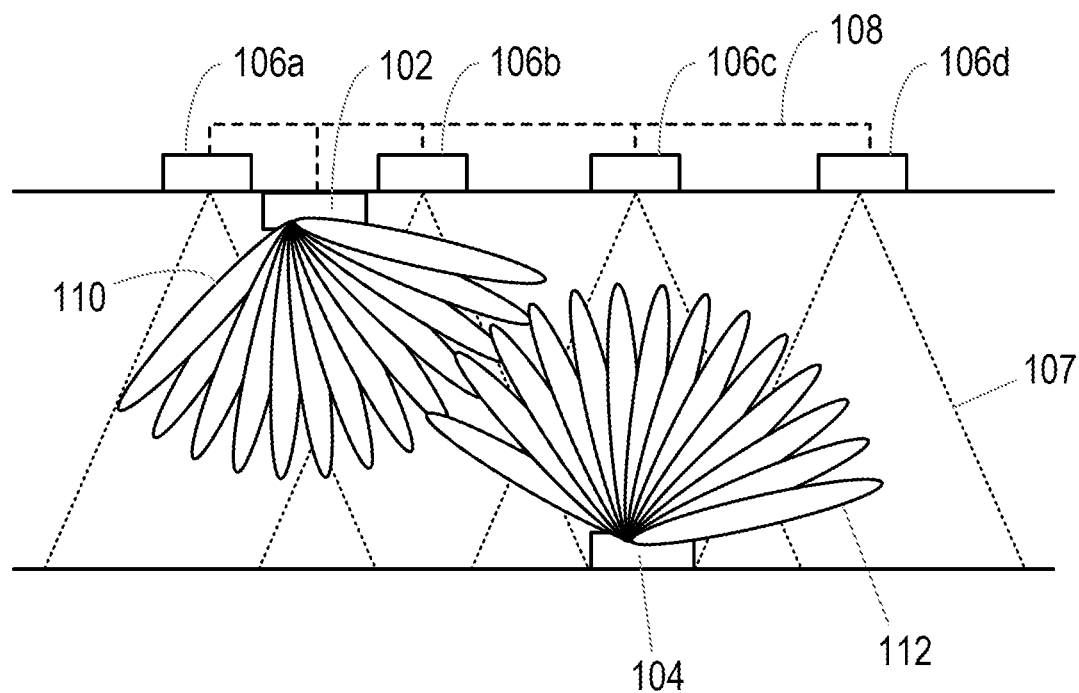
FIGS. 1a and 1b are schematic diagrams showing beamforming in a communication network according to embodiments of the disclosure.

FIG. 1a is a schematic diagram showing a communication network 100 according to embodiments of the disclosure. The illustration shows an example where the network 100 is deployed indoors (with the floor at the bottom of the page and the ceiling at the top); however, those skilled in the art will appreciate that the concepts disclosed herein are applicable to indoor and outdoor environments.

The network 100 comprises a radio access network node 102 and a wireless device 104.

The radio access network node 102 is configured to provide wireless radio access to the wireless device 104 implementing any suitable radio telecommunication standard. For example, the radio access network node 102 may form part of a cellular network, and provide radio access conforming to a cellular network radio standard such as those produced by the 3rd Generation Partnership Project (3GPP), e.g., Global System for Mobile Communications (GSM), General Packet Radio Service (GPRS), Enhanced Data Rates for GSM Evolution (EDGE), Universal Mobile Telecommunications System (UMTS), Long Term Evolution (LTE), LTE Advanced, and the 5G standard termed New Radio (NR). Alternatively, the radio access network node 102 may form part of a wireless local area network (WLAN), and provide radio access conforming to the IEEE 802.11 standards, for example. In this latter example, the radio access node may be termed an access point (AP). References to a "radio access network node" herein include at least cellular radio access network nodes and WLAN access points. In the illustrated embodiment, the radio access network node 102 is located on the ceiling; however, it will be understood that the radio access network node 102 may be located at any position.

The wireless device 104 is configured to communicate wirelessly with the radio access network node 102, and thus also implements the same standard as the radio access network node 102. For example, the wireless device 102 may alternatively be termed a user equipment (UE) or a mobile station (STA).

In the illustrated embodiment, the radio access network node 102 and the wireless device 104 each comprise a plurality of antennas or antenna elements (e.g. an antenna array or similar arrangement) for the transmission and/or reception of radio signals. Through the application of beamforming techniques, the radio access network node 102 and the wireless device 104 are thus both able to transmit radio signals having a greater strength and/or to receive radio signals with a higher sensitivity in a particular direction. For example, one or more respective weights or phase-shifts may be applied to signals provided to each antenna element, or received from each antenna element, so that signals from or to a particular direction experience constructive interference while those from other directions experience destructive interference. Those skilled in the art will be well aware of the principles of beamforming techniques.

Various beams are shown in the illustrated example. Those beams used by the radio access network node 102 are given the reference numeral 110, while those used by the wireless device 104 are given the reference numeral 112. It will be understood that the beams 110, 112 may be for the transmission or reception of wireless radio signals. For example, in one embodiment the radio access network node 102 is the transmitting device and the wireless device 104 is the receiving device; in this example the beams 110 are therefore transmit beams, while the beams 112 are receive beams. In another example, the wireless device 104 is the transmitting device and the radio access network node 102 is the receiving device; in this example the beams 112 are therefore transmit beams and the beams 110 are receive beams.

In a further example, transmit or receive beams may be utilized by only one of the radio access network node 102 and the wireless device 104, with the other transmitting or receiving radio signals omnidirectionally. Thus one of the radio access network node 102 and the wireless device 104 may transmit a radio signal using a directional beam, while the other of the radio access network node 102 and the wireless device 104 receives the radio signal without using beamforming. Similarly, one of the radio access network node 102 and the wireless device 104 may transmit a radio signal without using beamforming, while the other of the radio access network node 102 and the wireless device 104 receives the radio signal using a receive beam. The description below assumes that a transmit-receive beam pair is determined for the radio access network node 102 and the wireless device 104. However, it will be understood that embodiments of the disclosure also relate to the determination of a transmit or receive beam for just one of the radio access network node 102 and the wireless device 104.

As noted above, in order to benefit from beamforming gains, a transmitting device should determine an appropriate transmit beam (e.g., shape and/or direction) so as to transmit beams with higher gain in the direction of the receiving device. Similarly, a receiving device (whether an access point or a wireless device) should determine an appropriate receive beam (e.g., shape and/or direction) so as to receive beams with higher gain in the direction of the transmitting device. Such devices will typically use a process known as beamsweeping, in which the transmitting device transmits beams in all predefined directions, e.g., in a burst and/or at a regular interval. The receiving device performs measurements on those beams using all of its receiving beams, and reports the measurements to the transmitting device so that an appropriate transmit-receive beam pair can be determined. To be certain that the most appropriate beam pair is chosen, transmissions and corresponding measurements are performed for all possible transmit-receive beam pairs. This process is time consuming, and utilizes significant power and radio resources.

Embodiments of the disclosure utilize an alternative wireless communication technology to determine the location of a receiving device (whether the radio access network node 102 or the wireless device 104) with a reasonable degree of accuracy. The number of transmit and/or receive beams tested as part of a beamsweeping procedure can therefore be reduced, so as to target the known location of the receiving device.

In particular, embodiments of the disclosure utilize wireless light communication (sometimes referred to as "LiFi"), and thus the network 100 additionally comprises a plurality of wireless light communication network nodes 106a, 106b, 106c, 106d (collectively, 106).

Recent studies in academia and early prototypes from industry have shown that visible light communication (VLC) has the potential to become a new means of wireless communication. This is also the case for the general light communication (LC) which deploys frequencies that do not belong to the visible optical spectrum, such as infrared light. In particular, several gigabits per second (Gb/s) are anticipated from wireless communication systems that utilize the optical spectrum for communication purposes.

The main concept behind LC is to communicate binary data using rapidly varying levels of light intensity. In more detail, one or multiple light emitting diodes (LEDs) are deployed in the transmitting source in order to modulate binary data in different levels of emitted light intensity. The deployed LEDs change the levels of the emitted light intensity at rates that are not perceivable by the human eye. Thus, the incorporation of LC in an illumination system does not affect the quality of illumination. The receiving device detects the changes of the emitted light intensity using photo detectors (PDs), for example. In this way, the receiving device is able to detect the transmitted data.

Thus each of the wireless LC network nodes 106 comprises one or more light sources (such as LEDs) for the transmission of light. The light may have a wavelength which is in the visible part of the spectrum, or adjacent to it (e.g., infrared or ultraviolet). The light is subject to modulation with one or more data sources, such that the intensity of the light varies over time in a manner which can be detected and decoded by a receiving device. The line of sight area covered by this light is shown by the dashed lines 107. The wireless device 104 therefore comprises one or more photo detectors for the detection of the modulated light transmitted by the wireless LC network nodes 106, and in this way communications can take place in the downlink from the wireless LC network nodes 106 to the wireless device 104. The wireless device 104 may additionally comprise one or more light sources (such as LEDs), and the wireless LC network nodes 106 may comprise one or more photo detectors, so that communication can also take place in the uplink from the wireless device 104 to the LC network nodes 106.

Annex 1 below describes how the LC channel is dominated by the line of sight component between the transmitter (e.g., the LC nodes 106) and the receiver (e.g., the wireless device 104). When line of sight no longer exists between the transmitter and the receiver, the SINR of the communication decreases significantly such that a connection between the transmitter and the receiver is no longer viable. Therefore, if a connection is operational between an LC transmitter and an LC receiver, the location of the LC receiver is known; it must be within a line of sight of the LC transmitter. In the context of FIG. 1, if an LC connections exists between a wireless LC node 106 and the wireless device 104, the wireless device must be within the bounds of the transmitted light 107. This area is termed "an LC cell" 107 herein.

The wireless LC network nodes 106 may be independent of each other, providing independent services to wireless devices in a manner akin to separate radio base stations. For example, each wireless LC network node 106 may implement its own respective software protocol stack. Alternatively, the wireless LC network nodes 106 may form part of a larger entity, in a manner akin to different transmission-reception points of a radio base station. For example, each wireless LC network node 106 may implement one or more lower layers of a protocol stack, with a separate network entity implementing the higher layers for multiple wireless LC network nodes 106.

It will further be noted that the wireless LC nodes 106 are communicatively coupled to the radio access network node 102 via a backhaul connection 108. The backhaul connection 108 will typically be a wired connection, such as an Ethernet connection (e.g., power over Ethernet) or other packet data connection, although in certain embodiments the connection 108 may alternatively be wireless.

According to embodiments of the disclosure, the radio access network node 102 obtains information identifying an LC cell 107 or wireless LC network node 106 to which the wireless device 104 is connected. Based on that information, the radio access network node 102 is able to select a subset of the beams 110 which it is capable of producing, and to initiate a beamsweeping procedure using just that subset of beams to select a transmit or receive beam for communicating with the wireless device 104. Similarly, the wireless device 104 connects to an LC cell 107 or wireless LC network node 106 and, based on the LC cell or wireless LC network node 106, identifies a subset of the transmit or receive beams which it is capable of producing and performs a beamsweeping procedure using the subset of beams to select a transmit or receive beam for communicating with the radio access network node 102.

Figure 1B:
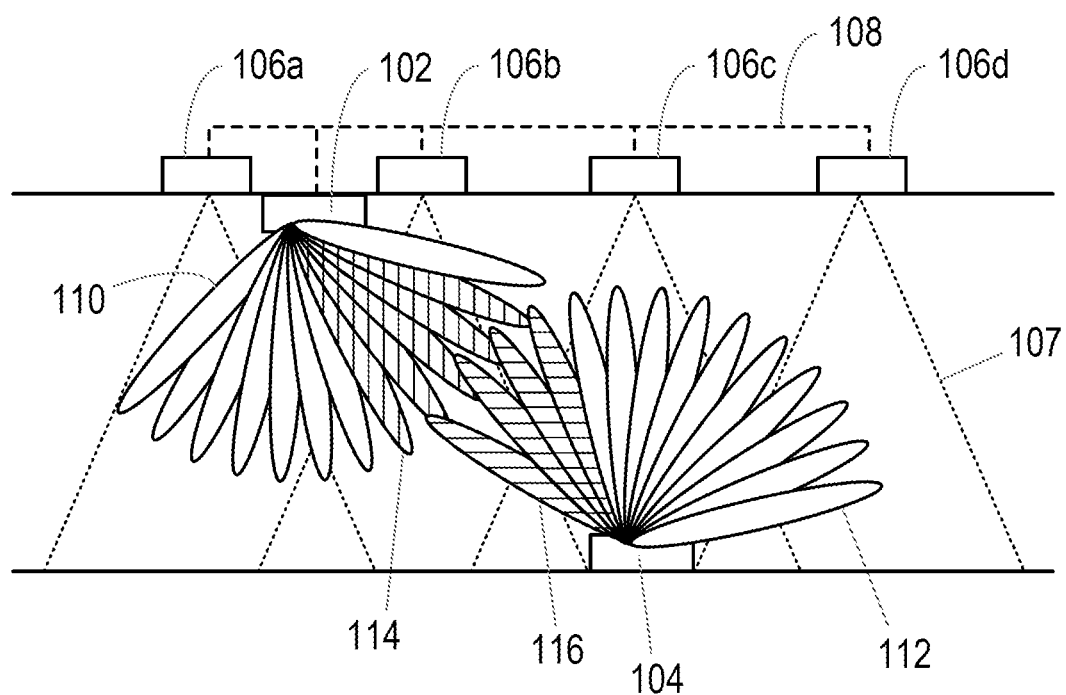

FIG. 1b shows the network 100 described above, once the selection of the subset of transmit or receive beams has taken place. In this example, the wireless device 104 establishes a connection with the wireless LC node 106c. Information identifying the wireless LC network node 106c or the LC cell 107 formed by it is provided to the radio access network node 102 (e.g., via the backhaul connection 108, or from a communication by the wireless device 104 itself), and the radio access network node consequently identifies beams 114 (a subset of the beams 110) which target just the cell 107. Similarly, the wireless device 104 identifies beams 116 (a subset of the beams 112) which target the radio access network node 102 from the identified cell 107. A beamsweeping procedure using just these subsets of beams 114, 116 therefore requires much less time and resources to complete.

Figure 2:
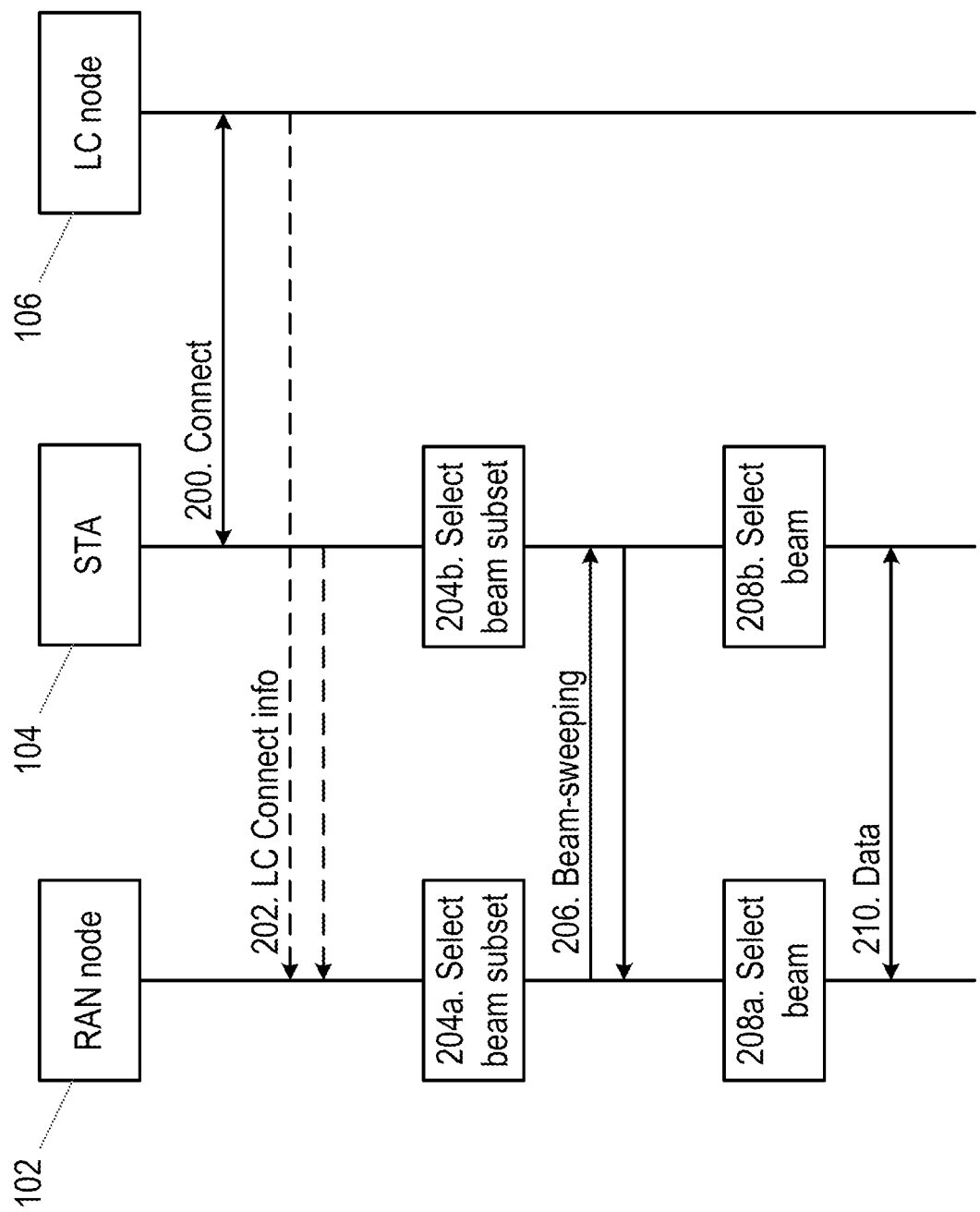
FIG. 2 is a signalling diagram according to embodiments of the disclosure.

FIG. 2 is a signalling diagram according to embodiments of the disclosure, showing signalling between a radio frequency network node or access point (such as the radio access network node 102 described above), a wireless device or STA (such as the wireless device 104 described above) and a wireless light communication network node or access point (such as the wireless LC nodes 106 described above).

200. The wireless device 104 connects to a wireless LC network node 106. For the reasons discussed above, and below in Annex 1, a connection with a wireless LC network node requires line of sight between the wireless device 104 and the wireless LC network node 106.

The connection to the wireless LC network node may be established using any suitable mechanism and/or according to any suitable standard which may be developed for LC communication in future. For example, the connection may be established using a form of random access, in which the wireless device 104 transmits an identifying code to the LC network node.

202. The radio access network node obtains information identifying the wireless LC network node to which the wireless device connected in step 200, or the LC cell formed by it. For example, the wireless LC network node may transmit a message to the radio access network node (e.g., via the backhaul link 108) containing an indication that the wireless device is connected to it. The indication may comprise an identifier for the wireless device. The message may also comprise an indication of the identity of the wireless LC network node or, alternatively, the identity of the wireless LC network node may be inferred from the source of the message. Alternatively, the wireless device may itself transmit a message to the radio access network node (e.g., via an established radio connection) containing an indication that it has connected to the wireless LC network node. The indication may comprise an identifier for the wireless LC network node or the LC cell. The message may also comprise an indication of the identity of the wireless device or, alternatively, the identity of the wireless device may be inferred from the source of the message. Those skilled in the art will appreciate that alternative methods of informing the radio access network node of the wireless device's connection are possible. For example, a further node (not illustrated), coupled to the wireless LC network nodes 106, may collate information as to which wireless devices are connected to which wireless LC network nodes, and provide the information to the radio access network node.

204a. The radio access network node selects a subset of one or more transmit or receive beams of those transmit or receive beams which are available to it, on the basis of the identified wireless LC network node or LC cell in step 202. For example, the subset of transmit or receive beams may be directed so as to target a geographical area including the geographical area of the LC cell, either to transmit messages to that area or to receive messages from that area.

The radio access network node may further utilize knowledge of the geographical location of the LC cell with respect to the radio access network node. For example, the radio access network node may be pre-programmed with the location of the LC cells in its vicinity, and/or respective subsets of beams to be used in order to target those LC cells. Alternatively, the radio access network node may acquire that knowledge over time, through its interactions with wireless devices which are connected to the LC cells in its vicinity. For example, the radio access network node may perform conventional beamsweeping procedures (i.e. using all available beams) to determine an optimal beam for a wireless device which is connected to a particular LC cell. The radio access network node may store an association between the particular LC cell and the optimal beam determined through the conventional method. The determined beam may be added to the subset of beams for that particular LC cell, for example.

The latter embodiment, of using historical data to select a subset of beams, may be particularly beneficial when no line of sight exists between the radio access network node and the wireless device. Thus, for example, historical data may be used to select the subset of transmit or receive beams when no line of sight is present between the radio access network node and the wireless device.

Those skilled in the art will be aware of several methods for determining whether a line of sight exists between two radio devices. Various papers address this topic, and are not described in further detail herein. For example, such methods may rely on detection of the polarization of wireless transmissions between the devices, to determine whether those transmissions reflected off surfaces between the devices. Alternatively, papers by Benedetto et al ("Dynamic LOS/NLOS Statistical Discrimination of Wireless Mobile Channels", 2007 IEEE Vehicular Technology Conference) and Borras et al ("Decision Theoretic Framework for NLOS Identification", 1998 IEEE Vehicular Technology Conference) take a statistical approach. The present disclosure is not limited in that respect.

204b. The wireless device selects a subset of one or more transmit or receive beams of those transmit or receive beams which are available to it, on the basis of the wireless LC network node to which it connected in step 200. For example, the subset of transmit or receive beams may correspond to those transmit beams which are directed towards the radio access network node from a coverage area of the identified wireless LC network node (e.g., the LC cell), or those receive beams in the coverage area of the identified wireless LC network node which are directed to receive transmissions from the radio access network node.

The wireless device may further obtain and utilize knowledge of the geographical location of the radio access network node with respect to the LC cell. For example, such knowledge may include, or be based on one or more of: angle-of-arrival information for one or more transmissions received from the radio access network node; location information received from the wireless LC network node forming the identified LC cell; and location information received from the radio access network node. Thus the wireless LC network node and/or the radio access network node (or any other node of the network 100) may provide the information implicitly or explicitly in a transmission to the wireless device.

The wireless device may further obtain and utilize knowledge of its orientation to select the subset of transmit or receive beams. For example, the wireless device may comprise one or more sensors (such as a compass, an accelerometer, a gyroscope, etc) from which it is able to determine its orientation with respect to a defined frame of reference. The wireless device is expected to be more mobile than the radio access network node, so its orientation is liable to change and effect the beams which will be effective in targeting the radio access network node from any given location. Therefore the orientation of the wireless device may also be taken into account when selecting the subset of the transmit or receive beams.

206. The radio access network node and the wireless device perform a beamsweeping procedure, using only the selected subset of transmit or receive beams. As noted above, this procedure may involve the transmitting device (whether the radio access network node or the wireless device) transmitting beams in all of the beams of the subset, e.g., in a burst and/or at a regular interval. The receiving device performs measurements on those beams using all of the receiving beams in the subset, and reports the measurements to the transmitting device so that an appropriate transmit-receive beam pair can be determined. To be certain that the most appropriate beam pair is chosen, transmissions and corresponding measurements may be performed for all possible transmit-receive beam pairs within the selected subsets. However, as only the subset of transmit and receive beams are swept, this process can be expected to be significantly less time-consuming and complex.

208a and 208b. The radio access network node and the wireless device select a transmit-receive beam pair based on the measurements performed in step 206. For example, the transmit-receive beam pair associated with a highest or best signal metric may be chosen, such as the received signal strength or quality.

210. The radio access network node and the wireless device utilize the selected transmit-receive beam pair to communicate with each other.

Figure 3:
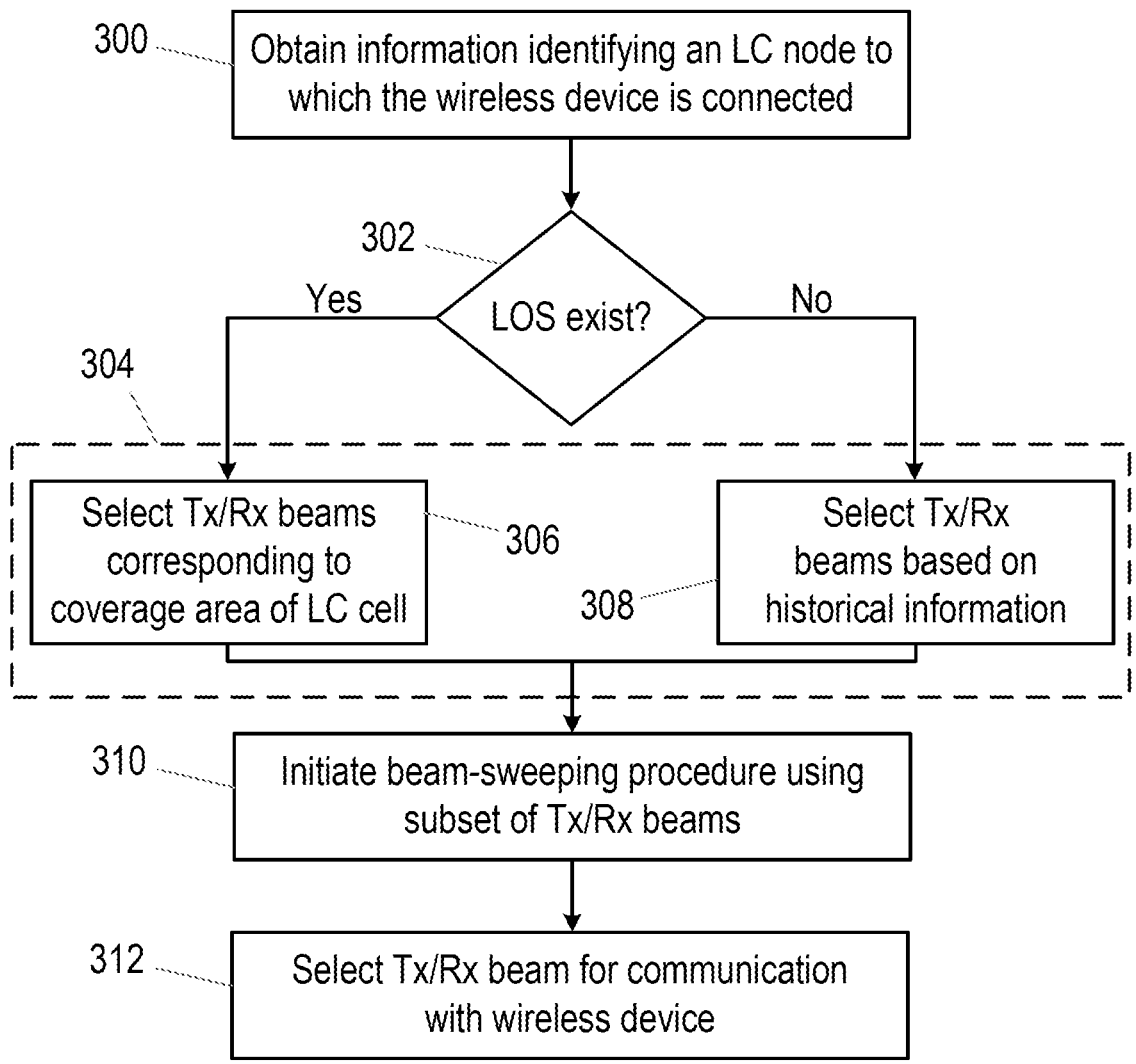
FIG. 3 is a flowchart of a method performed by a radio access network node according to embodiments of the disclosure.

FIG. 3 is a flowchart of a method performed by a radio access network node according to embodiments of the disclosure. The method may correspond in part to the signalling of the radio access network node or access point set out above with respect to FIG. 2, for example. The method may be performed by the radio access network node 102 described above with respect to FIG. 1.

In step 300, the radio network node obtains information identifying a wireless LC network node to which a wireless device has established a connection or an LC cell formed by the wireless LC network node. For example, the wireless LC network node may transmit a message to the radio access network node (e.g., via the backhaul link 108) containing an indication that the wireless device is connected to it. The indication may comprise an identifier for the wireless device. The message may also comprise an indication of the identity of the wireless LC network node or, alternatively, the identity of the wireless LC network node may be inferred from the source of the message. Alternatively, the wireless device may itself transmit a message to the radio access network node (e.g., via an established radio connection) containing an indication that it has connected to the wireless LC network node. The indication may comprise an identifier for the wireless LC network node or the LC cell formed by it. The message may also comprise an indication of the identity of the wireless device or, alternatively, the identity of the wireless device may be inferred from the source of the message. Those skilled in the art will appreciate that alternative methods of informing the radio access network node of the wireless device's connection are possible. For example, a further node (not illustrated), coupled to the wireless LC network nodes 106, may collate information as to which wireless devices are connected to which LC cells, and provide the information to the radio access network node.

The information may be obtained periodically, on demand from the radio access network node (e.g., in response to a request message transmitted by the radio access network node to the wireless device and/or the wireless LC network node), or on establishment of the connection with the wireless LC network node.

In step 302, the radio access network node determines whether a line of sight exists between the radio access network node and the wireless device. Various methods for determining whether a line of sight exists between two radio devices are discussed above.

The method then proceeds to step 304, in which the radio access network node selects a subset of one or more transmit or receive beams from those transmit or receive beams it is capable of using, based on the identified wireless LC network node. If line of sight does exist, this step involves the substep 306, in which the radio access network node selects a subset of one or more transmit or receive beams from those transmit or receive beams it is capable of using, based on the identified wireless LC network node and corresponding to the geographical coverage area of the LC cell. For example, the subset of transmit or receive beams may be directed so as to target a geographical area including the geographical area of the LC cell, either to transmit messages to that area or to receive messages from that area.

The radio access network node may further utilize knowledge of the geographical location of the LC cell with respect to the radio access network node when selecting the subset of transmit or receive beams. For example, the radio access network node may be pre-programmed with the location of the LC cells in its vicinity, and/or respective subsets of beams to be used in order to target those LC cells.

If line of sight does not exist, the step 304 involves substep 308, in which the radio access network node uses historical data to select a subset of transmit or receive beams. For example, over time, the radio access network node may perform multiple conventional beamsweeping procedures (i.e. using all available beams) to determine optimal beams for wireless devices which are connected to a particular wireless LC network node. The radio access network node may store an association between the particular wireless LC network node and those optimal beams determined through the conventional method. The determined beams may be added to the subset of beams for that particular wireless LC network node.

The beams may be generated using analogue, hybrid, or digital techniques, and thus the selection of a subset of beams in step 304 may comprise the selection of one or more beams from: a plurality of analogue beamformers; a plurality of analogue combiners; a digital codebook of beamformers; and a digital codebook of combiners.

In step 310, the radio access network node initiates a beamsweeping procedure using the subset of transmit or receive beams selected in step 304. As noted above, this procedure may involve the transmitting device (whether the radio access network node or the wireless device) transmitting beams in all of the beams of the subset, e.g., in a burst and/or at a regular interval. The receiving device performs measurements on those beams using all of the receiving beams in the subset, and reports the measurements to the transmitting device so that an appropriate transmit-receive beam pair can be determined. To be certain that the most appropriate beam pair is chosen, transmissions and corresponding measurements may be performed for all possible transmit-receive beam pairs within the selected subsets.

In step 312, the radio access network node selects a transmit or receive beam based on the measurements performed in step 310. For example, the transmit or receive beam associated with a highest or best signal metric may be chosen, such as the received signal strength or quality.

Figure 4:
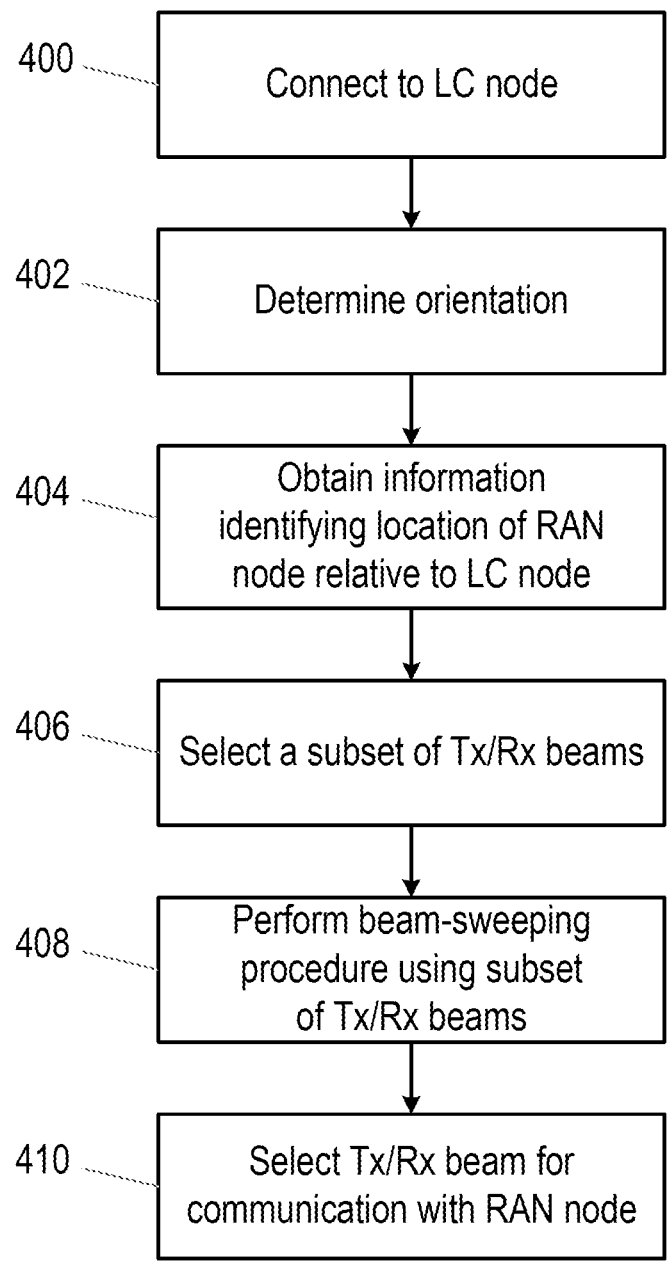
FIG. 4 is a flowchart of a method performed by a wireless device according to embodiments of the disclosure.

FIG. 4 is a flowchart of a method performed by a wireless device according to embodiments of the disclosure. The method may correspond in part to the signalling of the wireless device set out above with respect to FIG. 2, for example. The method may be performed by the wireless device 104 described above with respect to FIG. 1.

In step 400, the wireless device connects to a wireless LC network node 106. For the reasons discussed above, and below in Annex 1, a connection with a wireless LC network node requires line of sight between the wireless device 104 and the wireless LC network node 106.

The connection to the wireless LC network node may be established using any suitable mechanism and/or according to any suitable standard which may be developed for LC communication in future. For example, the connection may be established using a form of random access, in which the wireless device 104 transmits an identifying code to the wireless LC network node.

In step 402, the wireless device obtains knowledge of its orientation. For example, the wireless device may comprise one or more sensors (such as one or more of a compass, an accelerometer, a gyroscope, etc) from which it is able to determine its orientation with respect to a defined frame of reference.

In step 404, the wireless device obtains knowledge identifying the location of a radio access network node relative to the wireless LC network node forming its LC cell. For example, such knowledge may include, or be based on one or more of: angle-of-arrival information for one or more transmissions received from the radio access network node; location information received from the wireless LC network node forming the LC cell; and location information received from the radio access network node. Thus the wireless LC network node and/or the radio access network node (or any other node of the network 100) may provide the information implicitly or explicitly in a transmission to the wireless device.

In step 406, the wireless device selects a subset of one or more transmit or receive beams of those transmit or receive beams which are available to it, on the basis of the wireless LC network node to which it connected in step 400. For example, the subset of transmit or receive beams may correspond to those transmit beams which are directed towards the radio access network node from a coverage area of the identified wireless LC network node (e.g., the LC cell), or those receive beams in the coverage area of the identified wireless LC network node which are directed to receive transmissions from the radio access network node.

The selection of the subset of one or more transmit or receive beams may be further based on one or more of: the orientation of the wireless device, determined in step 402; and the location of the radio access network node relative to the wireless device or the wireless LC network node, determined in step 404.

In step 408, the wireless device performs a beamsweeping procedure, using only the selected subset of transmit or receive beams. As noted above, this procedure may involve the transmitting device (whether the radio access network node or the wireless device) transmitting beams in all of the beams of the subset, e.g., in a burst and/or at a regular interval. The receiving device performs measurements on those beams using all of the receiving beams in the subset, and reports the measurements to the transmitting device so that an appropriate transmit-receive beam pair can be determined. To be certain that the most appropriate beam pair is chosen, transmissions and corresponding measurements may be performed for all possible transmit-receive beam pairs within the selected subsets.

In step 410, the wireless device selects a transmit or receive beam based on the measurements performed in step 408. For example, the transmit or receive beam associated with a highest or best signal metric may be chosen, such as the received signal strength or quality.

Figure 5:
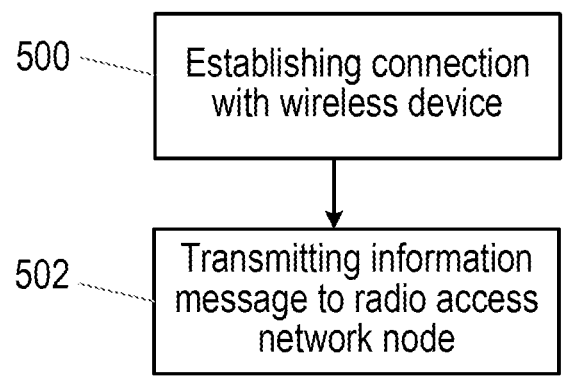
FIG. 5 is a flowchart of a method performed by a wireless light communication network node according to embodiments of the disclosure.

FIG. 5 is a flowchart of a method performed by a wireless LC network node according to embodiments of the disclosure. The method may correspond in part to the signalling of the wireless LC network node set out above with respect to FIG. 2, for example. The method may be performed by the wireless LC network node 106 described above with respect to FIG. 1.

In step 500, the wireless LC network node establishes a connection with a wireless device.

The connection between the wireless device and the wireless LC network node may be established using any suitable mechanism and/or according to any suitable standard which may be developed for LC communication in future. For example, the connection may be established using a form of random access, in which the wireless device transmits an identifying code to the wireless LC network node.

In step 502, the wireless LC network node transmits a message to a radio access network node (e.g., via the backhaul link 108) containing an indication that the wireless device is connected to it. The indication may comprise an identifier for the wireless device. The message may also comprise an indication of the identity of the wireless LC network node or, alternatively, the identity of the wireless LC network node may be inferred from the source of the message. Alternatively, this information may be transmitted indirectly to the radio access network node. For example, a further node (not illustrated), coupled to the wireless LC network node, may collate information as to which wireless devices are connected to which wireless LC network nodes, and provide the information to the radio access network node.

The message may be transmitted periodically, on demand from the radio access network node (e.g., in response to a request message transmitted by the radio access network node to the wireless LC network node), or on establishment of the connection with the wireless device in step 500.

Figure 6:
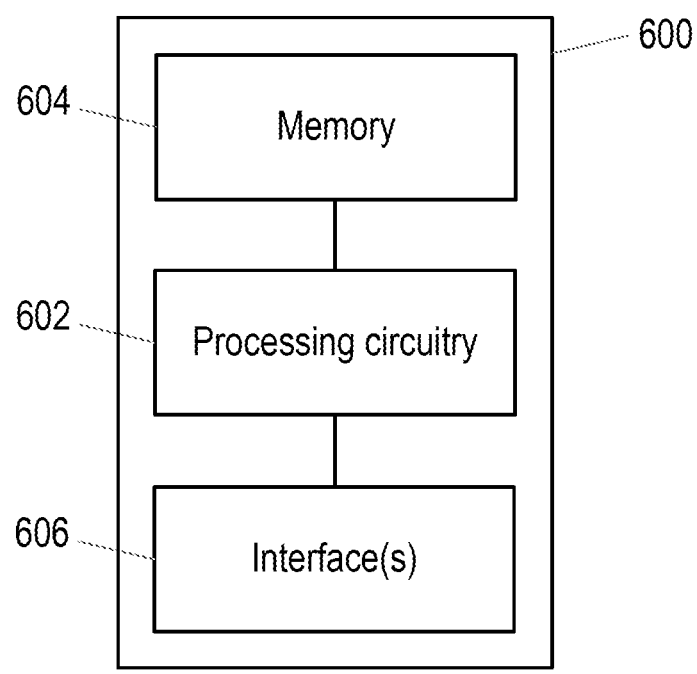
FIGS. 6 and 7 are schematic diagrams of a radio access network node according to embodiments of the disclosure.

FIG. 6 is a schematic diagram of a radio access network node 600 according to embodiments of the disclosure. The radio access network node 600 may be configured to perform the signalling of the radio access network node 102, described above with respect to FIG. 2, and/or the method described above with respect to FIG. 3. As noted above, in one embodiment, the radio access network node 600 is a WLAN access point.

The radio access network node 600 comprises processing circuitry 602 (such as one or more processors, digital signal processors, general purpose processing units, etc), a machine-readable medium 604 (e.g., memory such as read-only memory (ROM), random-access memory, cache memory, flash memory devices, optical storage devices, etc) and one or more interfaces 606. The one or more interfaces 606 may comprise a plurality of antenna elements configurable to provide a plurality of transmit or receive beams. The interfaces 606 may additionally comprise an interface for backhaul communications, such as a wireless, wired (e.g., power-over-Ethernet) or optical interface. The components are illustrated coupled together in series; however, those skilled in the art will appreciate that the components may be coupled together in any suitable manner (e.g., via a system bus or suchlike).

The radio access network node 600 is operable in a communication network comprising one or more wireless light communication (LC) network nodes. According to embodiments of the disclosure, the computer-readable medium 604 stores instructions which, when executed by the processing circuitry 602, cause the node 600 to: obtain information identifying a wireless LC network node to which the wireless device is connected; based on the identified wireless LC network node, select a subset of the plurality of transmit or receive beams; and initiate a beam-sweeping procedure using the subset of transmit or receive beams to select a transmit or receive beam for communication with the wireless device.

In further embodiments of the disclosure, the node 600 may comprise power circuitry (not illustrated). The power circuitry may comprise, or be coupled to, power management circuitry and is configured to supply the components of node 600 with power for performing the functionality described herein. Power circuitry may receive power from a power source. The power source and/or power circuitry may be configured to provide power to the various components of node 600 in a form suitable for the respective components (e.g., at a voltage and current level needed for each respective component). The power source may either be included in, or external to, the power circuitry and/or the node 600. For example, the node 600 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 7:
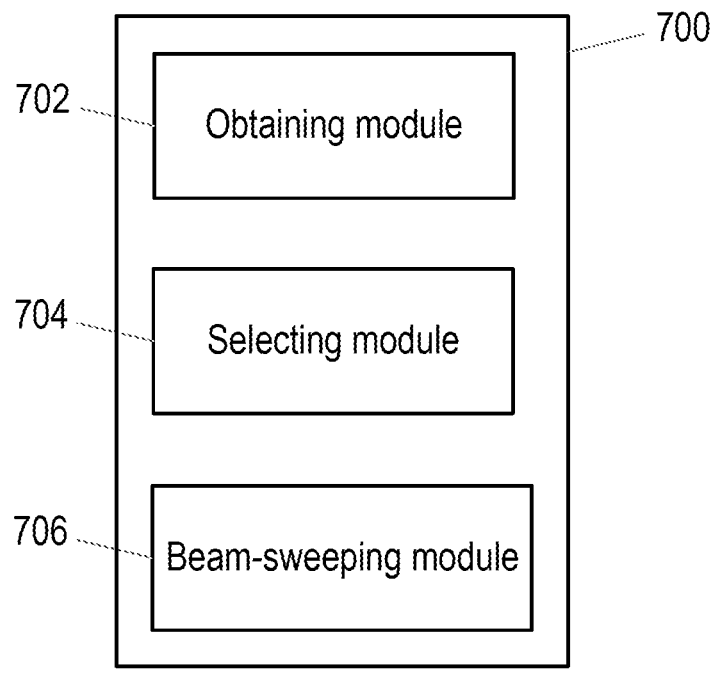

FIG. 7 is a schematic diagram of a radio access network node 700 according to embodiments of the disclosure. The radio access network node 700 may be configured to perform the signalling of the radio access network node 102, described above with respect to FIG. 2, and/or the method described above with respect to FIG. 3. As noted above, in one embodiment, the radio access network node 700 is a WLAN access point.

The radio access network node 700 comprises an obtaining unit 702, a selecting unit 704 and a beam-sweeping unit 706. The radio access network node may additionally comprise one or more interfaces (not illustrated). The one or more interfaces 706 may comprise a plurality of antenna elements configurable to provide a plurality of transmit or receive beams. The interfaces 706 may additionally comprise an interface for backhaul communications, such as a wireless, wired (e.g., power-over-Ethernet) or optical interface.

The radio access network node 700 is operable in a communication network comprising one or more wireless light communication (LC) network nodes. According to embodiments of the disclosure, the obtaining unit 702 is configured to obtain information identifying a wireless LC network node to which the wireless device is connected. The selecting unit 704 is configured to, based on the identified wireless LC network node, select a subset of the plurality of transmit or receive beams. The beam-sweeping unit 706 is configured to initiate a beam-sweeping procedure using the subset of transmit or receive beams to select a transmit or receive beam for communication with the wireless device.

Figure 8:
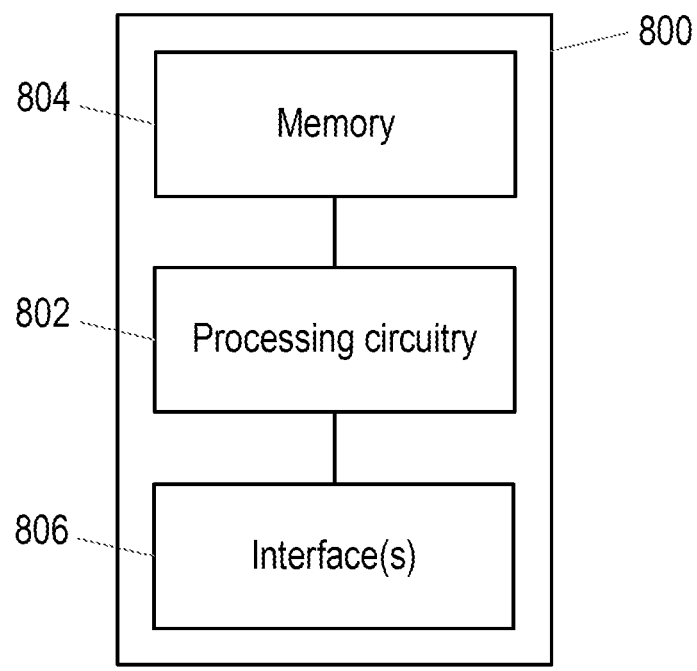
FIGS. 8 and 9 are schematic diagrams of a wireless device according to embodiments of the disclosure.

FIG. 8 is a schematic diagram of a wireless device 800 according to embodiments of the disclosure. The wireless device 800 may be configured to perform the signalling of the wireless device 104, described above with respect to FIG. 2, and/or the method described above with respect to FIG. 4.

The wireless device 800 comprises processing circuitry 802 (such as one or more processors, digital signal processors, general purpose processing units, etc), a machine-readable medium 804 (e.g., memory such as read-only memory (ROM), random-access memory, cache memory, flash memory devices, optical storage devices, etc) and one or more interfaces 806. The one or more interfaces 806 may comprise a plurality of antenna elements configurable to provide a plurality of transmit or receive beams. The components are illustrated coupled together in series; however, those skilled in the art will appreciate that the components may be coupled together in any suitable manner (e.g., via a system bus or suchlike).

The wireless device 800 is operable in a communication network comprising one or more wireless light communication (LC) network nodes. According to embodiments of the disclosure, the computer-readable medium 804 stores instructions which, when executed by the processing circuitry 802, cause the wireless device 800 to: connect to a wireless LC network node; based on the wireless LC network node to which the wireless device is connected, select a subset of the plurality of transmit or receive beams; and perform a beam-sweeping procedure using the subset of transmit or receive beams to select a transmit or receive beam for communication with the radio access network node.

In further embodiments of the disclosure, the wireless device 800 may comprise power circuitry (not illustrated). The power circuitry may comprise, or be coupled to, power management circuitry and is configured to supply the components of wireless device 800 with power for performing the functionality described herein. Power circuitry may receive power from a power source. The power source and/or power circuitry may be configured to provide power to the various components of wireless device 800 in a form suitable for the respective components (e.g., at a voltage and current level needed for each respective component). The power source may either be included in, or external to, the power circuitry and/or the wireless device 800. For example, the wireless device 800 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 9:
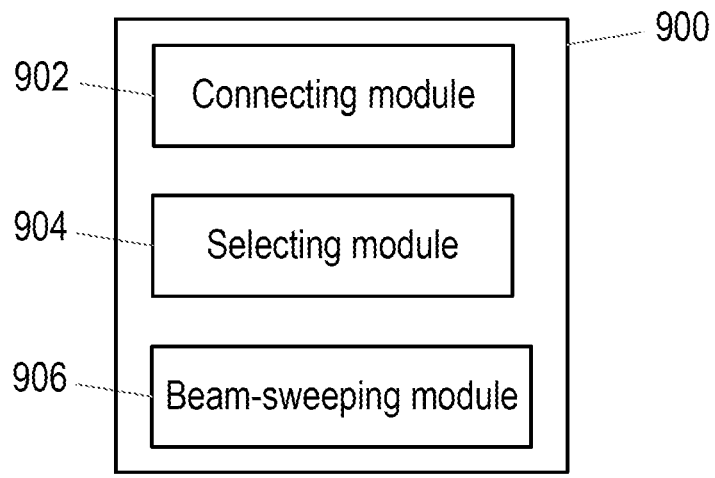

FIG. 9 is a schematic diagram of a wireless device 900 according to embodiments of the disclosure. The wireless device 900 may be configured to perform the signalling of the wireless device 104, described above with respect to FIG. 2, and/or the method described above with respect to FIG. 4.

The wireless device 900 comprises a connecting unit 902, a selecting unit 904 and a beam-sweeping unit 906. The wireless device may additionally comprise one or more interfaces (not illustrated). The one or more interfaces 906 may comprise a plurality of antenna elements configurable to provide a plurality of transmit or receive beams.

The wireless device 900 is operable in a communication network comprising one or more wireless light communication (LC) network nodes. According to embodiments of the disclosure, the connecting unit 902 is configured to connect to a wireless LC network node. The selecting unit 904 is configured to, based on the wireless LC network node to which the wireless device is connected, select a subset of the plurality of transmit or receive beams. The beam-sweeping unit 906 is configured to perform a beam-sweeping procedure using the subset of transmit or receive beams to select a transmit or receive beam for communication with the radio access network node.

Figure 10:
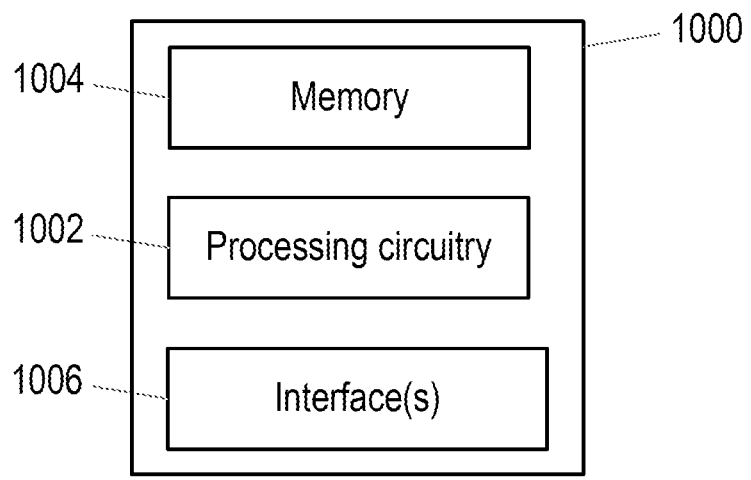
FIGS. 10 and 11 are schematic diagrams of a wireless light communication network node according to embodiments of the disclosure.

FIG. 10 is a schematic diagram of a wireless light communication network node 1000 according to embodiments of the disclosure. The radio access network node 1000 may be configured to perform the signalling of the wireless light communication network node 106, described above with respect to FIG. 2, and/or the method described above with respect to FIG. 5.

The wireless light communication access network node 1000 comprises processing circuitry 1002 (such as one or more processors, digital signal processors, general purpose processing units, etc), a machine-readable medium 1004 (e.g., memory such as read-only memory (ROM), random-access memory, cache memory, flash memory devices, optical storage devices, etc) and one or more interfaces 1006. The one or more interfaces 1006 may comprise one or more light sources (e.g., LEDs), whose output can be modulated with a data source to enable the transmission of wireless data over the light medium. The interfaces 1006 may additionally comprise an interface for backhaul communications, such as a wireless, wired (e.g., power-over-Ethernet) or optical interface. The components are illustrated coupled together in series; however, those skilled in the art will appreciate that the components may be coupled together in any suitable manner (e.g., via a system bus or suchlike).

The wireless LC network node 1000 is operable in a communication network further comprising one or more radio access network nodes, each forming a respective radio cell.

According to embodiments of the disclosure, the computer-readable medium 1004 stores instructions which, when executed by the processing circuitry 1002, cause the node 1000 to: establish a wireless LC connection with a wireless device; and transmit, to a radio access network node, an information message comprising an indication that the wireless device is connected to the wireless LC network node.

In further embodiments of the disclosure, the node 1000 may comprise power circuitry (not illustrated). The power circuitry may comprise, or be coupled to, power management circuitry and is configured to supply the components of node 1000 with power for performing the functionality described herein. Power circuitry may receive power from a power source. The power source and/or power circuitry may be configured to provide power to the various components of node 1000 in a form suitable for the respective components (e.g., at a voltage and current level needed for each respective component). The power source may either be included in, or external to, the power circuitry and/or the node 1000. For example, the node 1000 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 11:
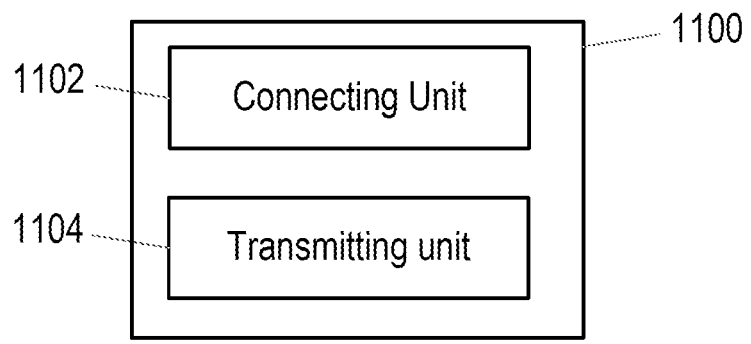

FIG. 11 is a schematic diagram of a wireless light communication network node 1100 according to embodiments of the disclosure. The wireless light communication network node 1100 may be configured to perform the signalling of the wireless light communication network node 106, described above with respect to FIG. 2, and/or the method described above with respect to FIG. 5.

The wireless light communication network node 1100 comprises a connecting unit 1102 and a transmitting unit 1104. The wireless light communication network node may additionally comprise one or more interfaces (not illustrated). The one or more interfaces 1106 may comprise one or more light sources (e.g., LEDs), whose output can be modulated with a data source to enable the transmission of wireless data over the light medium. The interfaces 1006 may additionally comprise an interface for backhaul communications, such as a wireless, wired (e.g., power-over-Ethernet) or optical interface.

The wireless LC network node 1100 is operable in a communication network further comprising one or more radio access network nodes, each forming a respective radio cell.

According to embodiments of the disclosure, the connecting unit 1102 is configured to establish a wireless LC connection with a wireless device. The transmitting unit 1104 is configured to transmit, to a radio access network node, an information message comprising an indication that the wireless device is connected to the wireless LC network node.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 12:
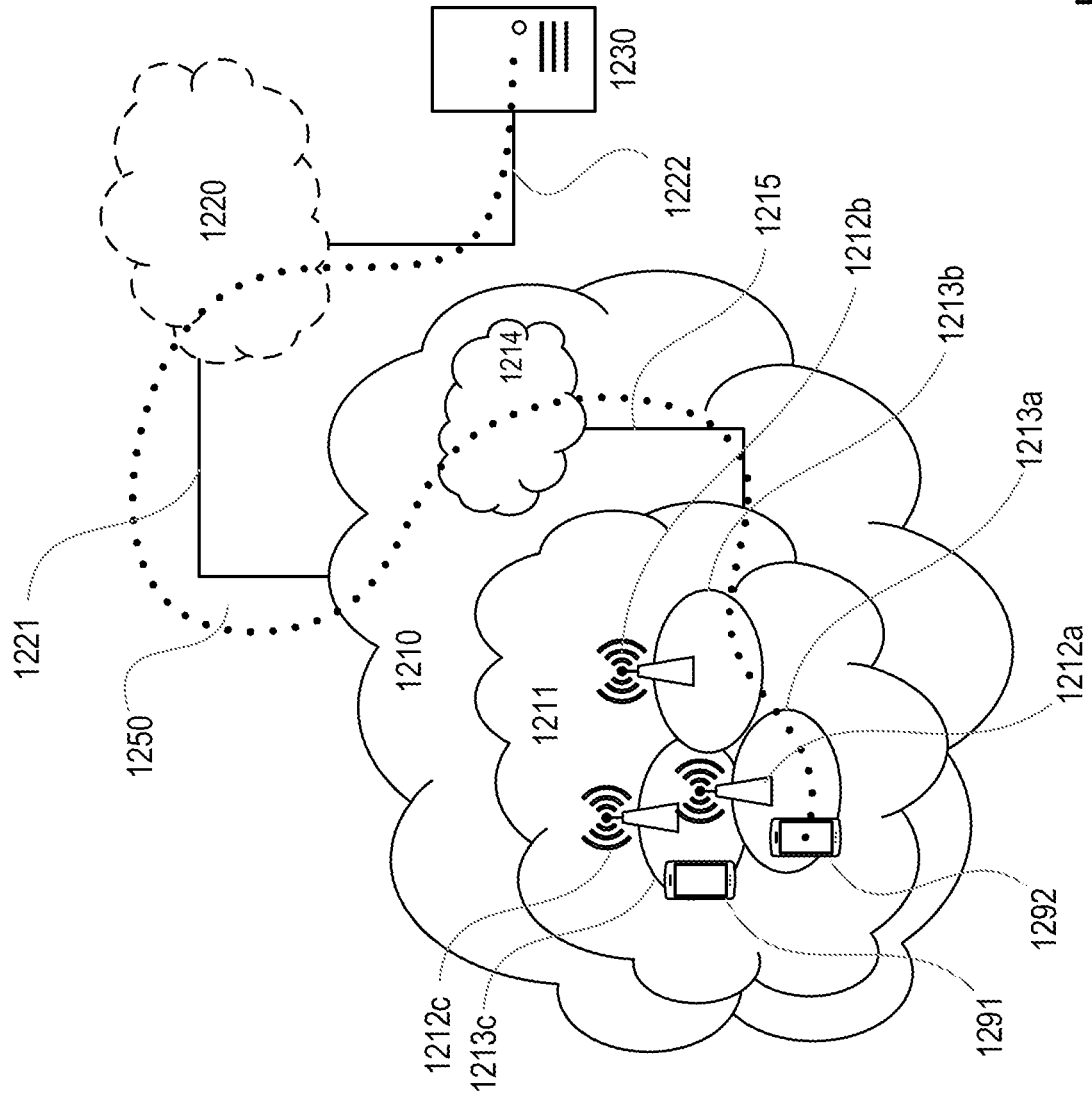
FIG. 12 shows a telecommunication network connected via an intermediate network to a host computer in accordance with some embodiments of the disclosure.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

Figure 13:
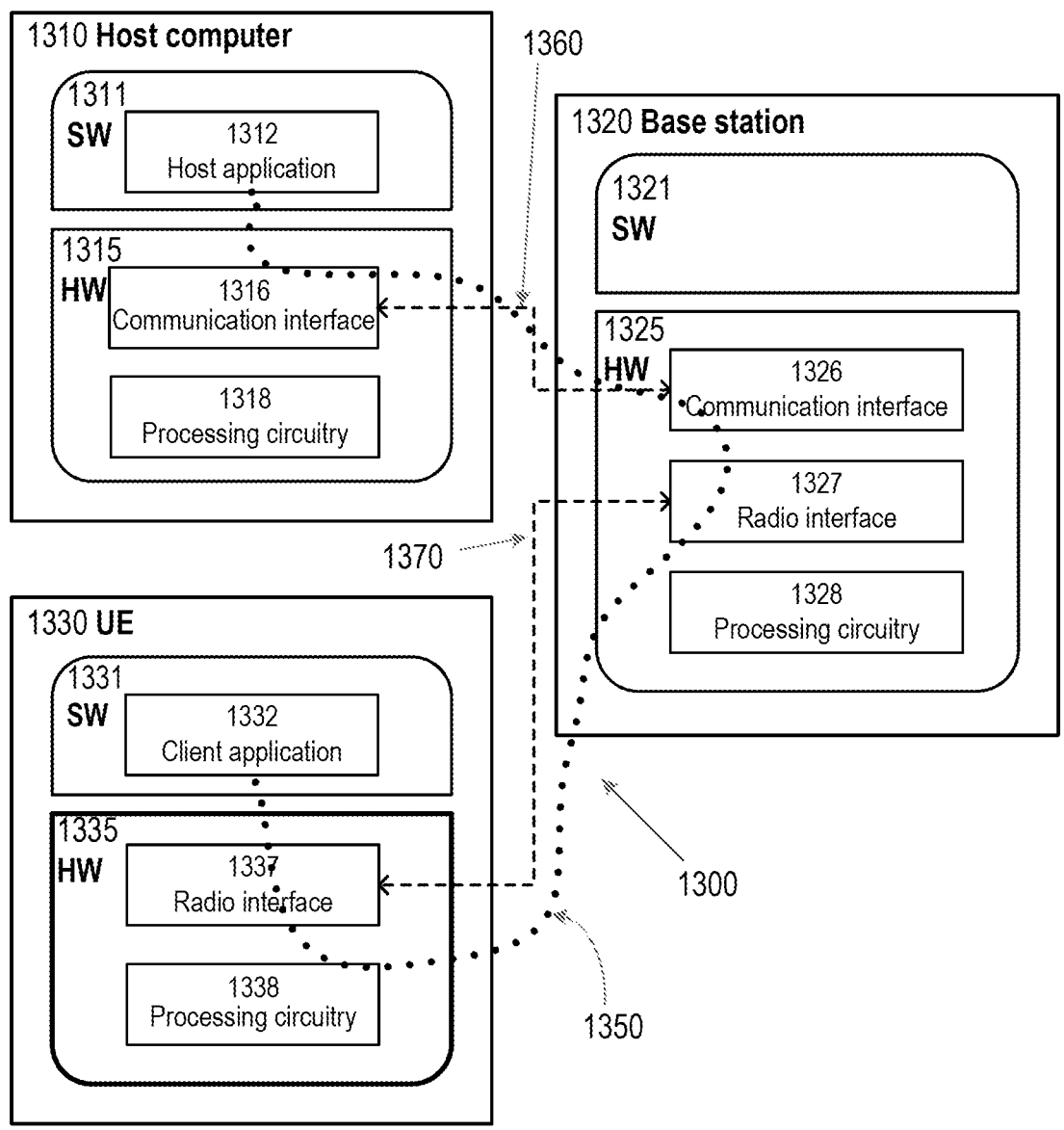
FIG. 13 shows a host computer communicating via a base station with a user equipment over a partially wireless connection in accordance with some embodiments of the disclosure.

It is noted that host computer 1310, base station 1320 and UE 1330 illustrated in FIG. 13 may be similar or identical to host computer 1230, one of base stations 1212*a*, 1212*b*, 1212*c* and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve latency and power consumption and thereby provide benefits such as reduced user waiting time and extended battery lifetime.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
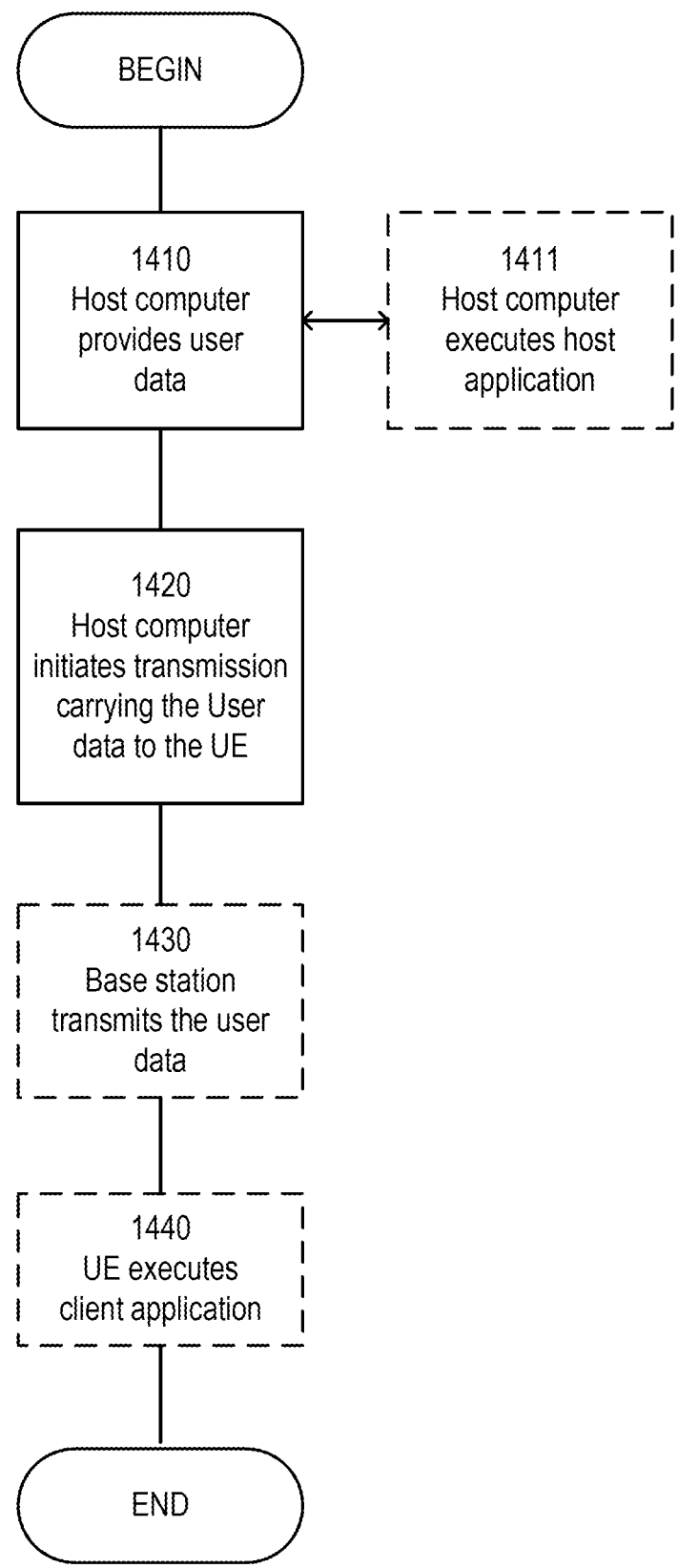
FIGS. 14 to 17 show methods implemented in a communication system including a host computer, a base station and a user equipment in accordance with some embodiments of the disclosure.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
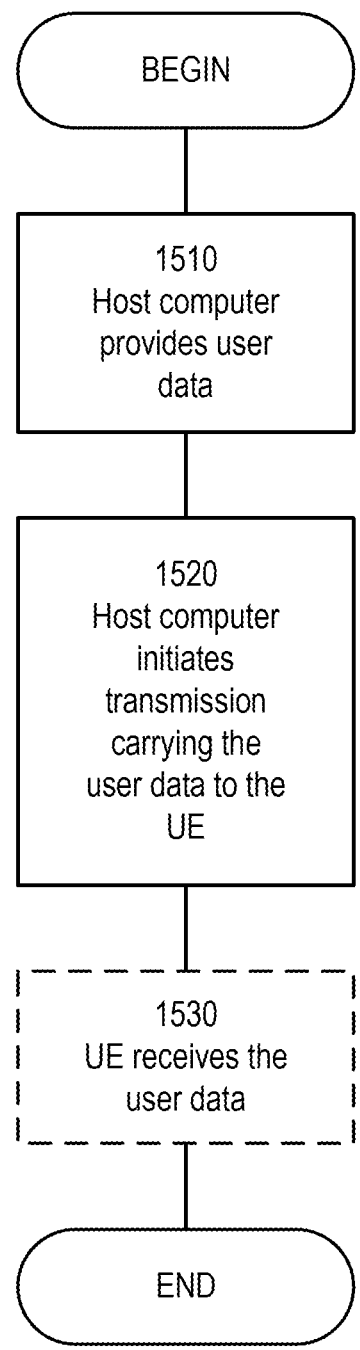

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
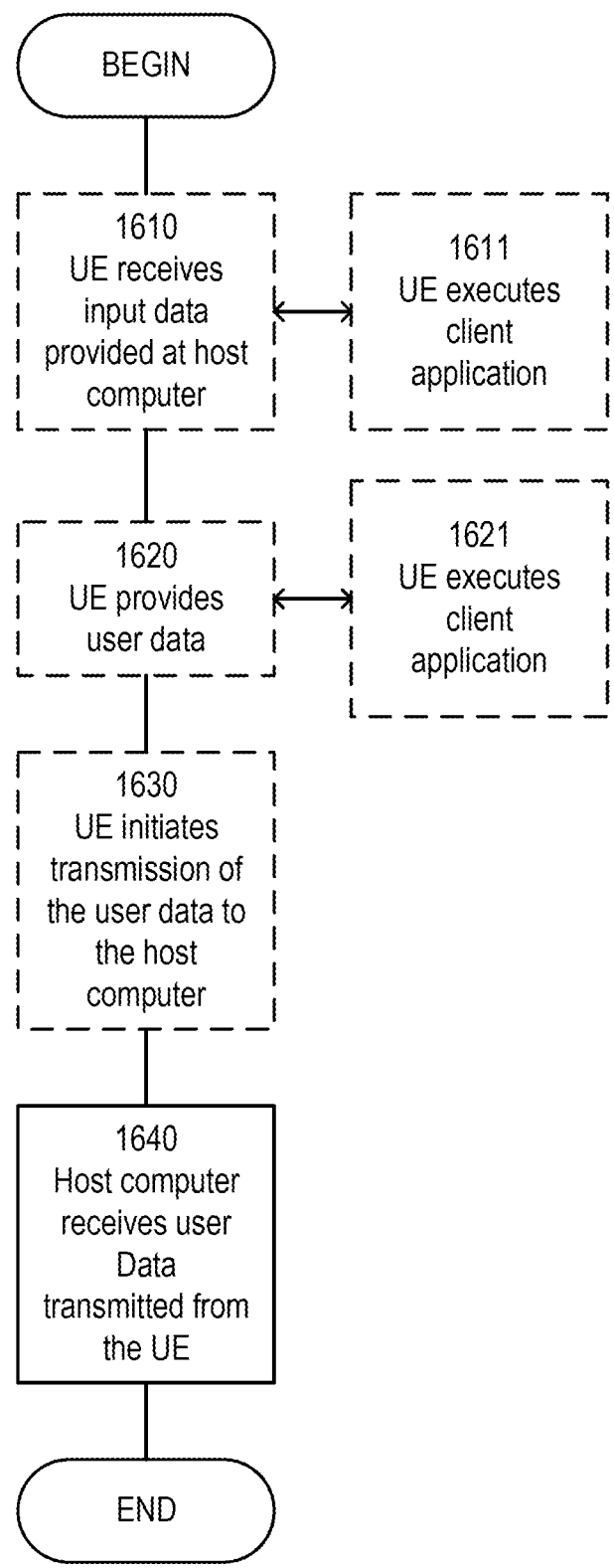

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
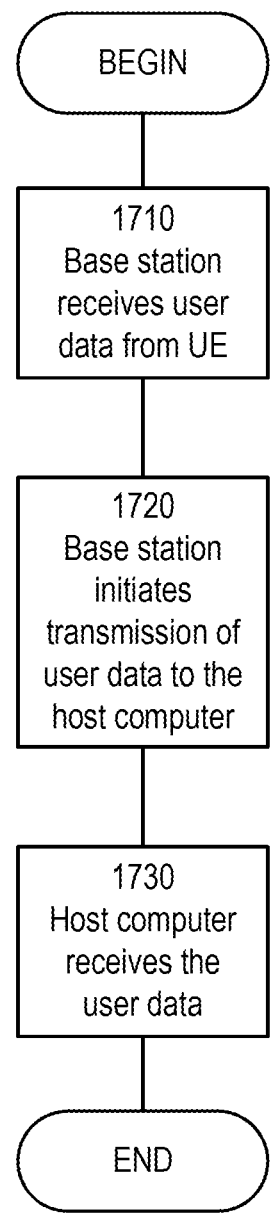

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

ANNEX A

Point-to-Point Light Communication

Recent studies in academia and early prototypes from industry have shown that Visible Light Communication (VLC) has the potential to become a new means of indoor wireless communication. This is also the case for the general Light Communication (LC) which deploys frequencies that do not belong to the visible optical spectrum, such as infrared light. In particular, several Gigabits per Second (Gb/s) are anticipated from wireless communication systems that utilize the optical spectrum for communication purposes.

The main concept behind LC is to communicate binary data using rapidly varying levels of light intensity. In more detail, one or multiple light-emitting diode (LEDs) are deployed by the transmitting source in order to modulate binary data in different levels of emitted light intensity. The deployed LEDs change the levels of the emitted light intensity at rates which are not perceivable by the human eye. Thus, the incorporation of LC in an illumination system does not affect the quality of illumination. The receiving device detects the changes of the emitted light intensity using, for example, photo detectors (PDs), and in this way, the receiving device is able to detect the transmitted binary data. As implied before, due to the nature of the optical channel, the use of intensity modulation (IM) with direct detection (DD) is used (see, for example, a paper by Kahn and Barry, "Wireless Infrared Communications", Proceedings of the IEEE, vol 85, pp 265-298). This means that the transmitted/received signal has to be real and strictly positive. This imposes certain constraints in the deployed communication techniques, both in single and multi-carrier transmission. However, due to the relative large physical area of a PD compared to the carrier wavelength, multipath fading is absent. Therefore, LC may use less complex signal-processing techniques.

Assuming a point-to-point LC system with $N_t$ transmitting LEDs and $N_r$ receiving PDs, the optical channel, in the time domain, between the i-th PD, i=1, ..., $N_r^{LC}$, and the j-th LED, j=1, ..., $N_t^{LC}$ is given as:

$$h_{i,j}^{LC}(t) = h_{i,j}^{LOS} + h_{i,j}^{NLOS}(t), \qquad (1)$$

where, $h_{i,j}^{LOS}$, represents the Line-of-Sight (LOS) component, while, $h_{i,j}^{NLOS}(t)$, represents the diffuse component. In the academic literature, the LoS component $h_{i,j}^{LOS}$ is also referred as the Direct Current (DC) component. The diffuse component $h_{i,j}^{NLOS}(t)$ is the aggregate result of multiple light reflections from the surrounding surfaces. In (1), $h_{i,j}^{LOS}$ represents the LOS optical gain, which is given as:

$$h_{i,j}^{LOS} = \begin{cases} \dfrac{A(k+1)}{2\pi d_{i,j}^2} \cos^k(\phi_{i,j})\cos(\psi_{i,j}), & 0 \le \psi_{i,j} \le \Psi_{\frac{1}{2}} \\ 0, & \psi_{i,j} \ge \Psi_{\frac{1}{2}}, \end{cases} \qquad (2)$$

where, A represents the area of each PD and k is the Lambertian factor which denotes the directionality order. The Lambertian factor k is given as:

$$k = -\frac{\ln(2)}{\ln\left(\cos\left(\Phi_{\frac{1}{2}}\right)\right)} \qquad (3)$$

with, $$\Phi_{\frac{1}{2}}$$

being the transmitter semi-angle. Furthermore, d is the distance between the i-th PD and the j-th LED. The angles $\phi_{i,j}$ and $\psi_{i,j}$ denote the angle of emission of the j-th LED to the i-th PD with respect to the transmitter plane and the angle of incidence of the light at the i-th PD from the j-th LED with respect to the orthonormal vector of the receiver plane of the i-th PD, respectively. The field of view (FOV) semi-angle of each PD is denoted as $$\Psi_{\frac{1}{2}}.$$

Given that the LEDs and PDs are placed in a three-dimensional space, their spatial positions can be described by their Cartesian coordinates. Thus, the angle $\phi_{i,j}$ and $\psi_{i,j}$ can be computed as:

$$\phi_{i,j} = \arccos\left(\frac{\mathrm{dot}\left(o_t^j, p_r^i - p_t^j\right)}{d_{i,j}}\right), \qquad (4)$$

and, $$\psi_{i,j} = \arccos\left(\frac{\mathrm{dot}\left(o_r^i, p_t^j - p_r^i\right)}{d_{i,j}}\right). \qquad (5)$$

In (5) and (4), dot(x, y)=$x^T y$, represents the inner product between the vectors x and y. Also, $p_t^j$ and $p_r^i$ are 3×1 vectors which represent the Cartesian coordinates of the j-th LED, j=1, ..., $N_t^{LC}$, and, i-th PD, i=1, ..., $N_r^{LC}$, respectively. The orientation of the j-th LED, j=1, ..., $N_t$, is given from the 3×1 orthonormal vector, $o_t^j$, which is vertical to the plane of the LED. Similarly, the orthonormal vector, $o_r^i$, which is vertical to the plane of the i-th PD, represents the orientation of the i-th PD. Finally, the distance, $d_{i,j}$, between the i-th PD and the j-th LED can be computed as:

$$d_{i,j} = \|p_r^i - p_t^j\|_2 \qquad (6)$$

In typical indoor LC scenarios, most of the optical signal energy is included in the LOS component. In more detail, the LOS component includes 95% of the energy collected by the PDs. Therefore, based on experimental measurements and academic research, the diffuse component, $h_{i,j}^{NLOS}(t)$, can be neglected. Thus, it is quite reasonable to assume that:

$$h_{i,j}^{LC}(t) \approx h_{i,j}^{LOS}. \tag{7}$$

Even though the optical bandwidth is large, LC communication is bandwidth limited due to the frequency selective nature of off-the-shelf LEDs. In more detail, an off-the-shelf LED behaves like a lowpass filter with a frequency response $H_{LED}(f)$. The specific form of the frequency response of an LED, $H_{LED}(f)$, depends on the specific type of LED (blue or white). Thus, it is expected to be given in the form of specifications from its manufacturer or obtained via experimental measurements. Note that $H_{LED}(f)$ does not depend on the specific positions of the deployed LEDs and PDs. Considering the approximation of the optical channel in (7) and the frequency response of the LED, $H_{LED}(f)$, the composite LC channel, which includes both the LED and the actual physical optical channel, is expressed (approximated) as:

$$H_{i,j}^{LC}(f) \approx h_{i,j}^{LOS} H_{LED}(f). \tag{8}$$

Note that, here, without loss of generality, it is indirectly assumed that all LEDs belong to the same family and have the same frequency response. If this is not the case, additional indices in (8) can be used for denoting the different frequency responses of each used family of LEDs. Provided that the transmission rate is set properly for avoiding inter-symbol interference (ISI) or ISI can be neglected, the system equation of a single carrier MIMO LC system is expressed as:

$$y = r H_{LED}(f) H^{LC} x + w^{LC}. \tag{9}$$

In (9), the $N_r^{LC} \times 1$ received signal vector is expressed as y; the responsivity of the PD, in A/W, is denoted by r; $H^{LC}$ is a $N_r^{LC} \times N_t^{LC}$ matrix which denotes the optical physical MIMO channel; the (i, j) element of $H^{LC}$, i=1, ..., $N_r^{CL}$, and, j=1, ..., $N_t^{CL}$, is given by (2); x is the $N_t^{CL} \times 1$ transmitted optical signal vector; the elements of x depend from the deployed MIMO transmission scheme and the used constellation for optically modulating binary data; finally, $w^{LC}$ is a $N_r^{LC} \times 1$ vector which represents the composite effect of ambient shot and thermal noise.

Due to the nature of the optical channel, the formation of orthogonal frequency division multiplexing (OFDM)-based communication is more challenging compared with radio frequency (RF) communication. In more detail, as mentioned before, the optical channel supports the transmission of real and non-negative signals. Therefore, the design of a multicarrier LC requires the treatment of the previous limitation. A technique for creating real signals from complex signals is the use of inverse fast Fourier transform (IFFT) combined with its Hermitian symmetry in the frequency domain. This technique creates real signals, which can be negative or positive, by sacrificing half of the available subcarriers. As the resulting signals are still negative or positive (bipolar), they can be represented/approximated in a positive form (unipolar). In literature, this has been achieved using different approaches. This resulted in a plethora of optical OFDM based modulation schemes (e.g., as described in a paper by Tsonev, Sinanovic and Haas, "Complete Modeling of Nonlinear Distortion in OFDM-Based Optical Wireless Communications", Journal of Lightwave Technology, vol 31, pp 3064-3076). One example is the DCO-OFDM which simply introduces a DC bias to resulting bipolar signals combined with clipping (for removing the large values). Despite the plethora of different OFDM based schemes, all schemes aim to create a number of orthogonal sub-carriers which form a flat transmit spectrum. Irrespective of the considered optical OFDM-based modulation scheme, the k-th sub-carrier is described mathematically as:

$$y_k = r H_{LED}(f_k) H^{LC} x_k + w_k, \tag{10}$$

k=1 ..., $N_c^{LC}$, after applying the IFFT and the appropriate representation processing. The last processing depends from the specific optical OFDM-based scheme. Here, $N_c^{LC}$ is the number of the created sub-carriers. Note that the previous equation holds as long as any form of linear and non-linear distortion, such as clipping for DC-OFDM, is ignored.

Cellular Deployment in LC Networks

Similar to RF communication, LC can be used in a cellular deployment where multiple access points (APs) are dedicated for providing wireless coverage in an indoor space. For example, multiple luminaries which act as LC APs can be placed properly in the ceiling of a room for the purposes of illumination and optical wireless communication. Here, it is assumed that the considered LC APs are interconnected using a backhaul connection, such as power-over-Ethernet. The main objective of cellular communication is to increase the number of served stations (STAs) by spatially separating the considered (indoor) space into multiple cells. Each cell is allocated a certain number of STAs which are served in a certain portion of the available optical spectrum. The spectrum allocation in each cell depends from the considered policy and frequency reuse factor. The value of the frequency reuse factor determines the level of interference observed by each cell. In the limit, the whole spectrum is used throughout the cellular network and the highest level of interference is observed. Furthermore, each STA is associated with a specific AP (cell) based on a certain objective function. For example, one method is to associate each STA to the AP which provides the highest value of signal-to-interference-plus-noise ratio (SINR). An alternative method is to associate each STA to the AP with closest spatial proximity. Note that in LC, due to the directional nature of the optical wireless channel, the formation of a LC cellular system is heavily influenced by the geometrical setup of the AP and the spatial positions and orientations of the STAs. This becomes clear by observing (2) and (8). Through (2) and (8), it can be seen that the parameters of the spatial setup of a transceiver along with its optical specifications determine the exact value of its optical channel and consequently its observed receive SINR.

Approximate Positioning in LC Cellular Networks

A major characteristic of LC is the very directional nature of its optical channel, especially under the use of lenses. In particular, this can be seen clearly from (2) and (8), where the optical wireless channel is approximated in a convenient form. In more detail, (2) and (8) show that the LC channel is determined by the geometric setup of the considered transceiver and the specifications of the deployed LEDs and PDs.

The achieved receive SINR of a LC transceiver, in the k-th subcarrier, is given as:

$$SINR_k = \frac{r^2 H_{LED}(f_k)^2 \|H^{LC}\|_F^2 P_k^2}{N_k + I_k}, \tag{11}$$

where, $P_k$ is the transmitted optical power in the k-th subcarrier; $N_k$ is the variance of the Gaussian and shoot noise in the k-th subcarrier; and/k is the interference power in the k-th subcarrier. Here, $\|\cdot\|_F$ is the Frobenius norm.

In the future cellular LC networks, it can be assumed that interference will be well controlled due to the careful deployment planning of the transmitting LED. Therefore, the effect of interference can be assumed either as negligible ($I_k \approx 0$) or the value of interference, $I_k$, can be accurately estimated or bounded for any given position in space. In particular, for each considered LC cell, the maximum level of interference, $I_{max}$, can be computed off-line for the coverage region of each cell. Thus, for each LC cell, the interference, $I_k$, in (11) can be treated as a deterministic quantity which is known. For this reason, the concurrent observation of (2)-(8), and (11) shows that the value of $SINR_k$ can be accurately estimated/bounded from (11) for each position in the three-dimensional space. Thus, if the cell association method used by a LC cellular network is based on the value of $SINR_k$ in (11), for one, a portion, or all the available subcarriers, the coverage area of each cell can be accurately defined and estimated. The direct result of this conclusion is that, when a LC receiver is associated with a certain cell, the network can accurately know the approximate position of this receiver. Obviously, this holds directly when the cell association is based on the spatial position of the LC receiver.

In general, it can be concluded that, due to the directional nature of the LC channel, the coverage space of an LC cell can be accurately estimated from the network. Thus, when a LC receiver is associated with a specific LC cell, its approximate position is directly known by the network.

ANNEX B

The following numbered paragraphs set out embodiments of the disclosure, and refer to the claims appended hereto:

1. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of claims 1 to 10.
2. The communication system of the previous embodiment further including the base station.
3. The communication system of the previous 2 embodiments, further including the UE, wherein the UE is configured to communicate with the base station.
4. The communication system of the previous 3 embodiments, wherein:
   the processing circuitry of the host computer is configured to execute a host application, thereby providing the user data; and
   the UE comprises processing circuitry configured to execute a client application associated with the host application.
5. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of claims 1 to 10.
6. The method of the previous embodiment, further comprising, at the base station, transmitting the user data.
7. The method of the previous 2 embodiments, wherein the user data is provided at the host computer by executing a host application, the method further comprising, at the UE, executing a client application associated with the host application.
8. A user equipment (UE) configured to communicate with a base station, the UE comprising a radio interface and processing circuitry configured to performs the of the previous 3 embodiments.
9. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.
10. The communication system of the previous embodiment, wherein the cellular network further includes a base station configured to communicate with the UE.
11. The communication system of the previous 2 embodiments, wherein:
    the processing circuitry of the host computer is configured to execute a host application, thereby providing the user data; and
    the UE's processing circuitry is configured to execute a client application associated with the host application.
12. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs any of the steps of any of claims 11 to 18.
13. The method of the previous embodiment, further comprising at the UE, receiving the user data from the base station.
14. A communication system including a host computer comprising:
    communication interface configured to receive user data originating from a transmission from a user equipment (UE) to a base station,
    wherein the UE comprises a radio interface and processing circuitry, the UE's processing circuitry configured to perform any of the steps of any of claims 11 to 18.
15. The communication system of the previous embodiment, further including the UE.
16. The communication system of the previous 2 embodiments, further including the base station, wherein the base station comprises a radio interface configured to communicate with the UE and a communication interface configured to forward to the host computer the user data carried by a transmission from the UE to the base station.
17. The communication system of the previous 3 embodiments, wherein:

the processing circuitry of the host computer is configured to execute a host application; and the UE's processing circuitry is configured to execute a client application associated with the host application, thereby providing the user data.

18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

19. A method implemented in a communication system including a host computer, a base station and a user equipment (UE), the method comprising:

at the host computer, receiving user data transmitted to the base station from the UE, wherein the UE performs any of the steps of any of claims 11 to 18.

20. The method of the previous embodiment, further comprising, at the UE, providing the user data to the base station.

21. The method of the previous 2 embodiments, further comprising:

at the UE, executing a client application, thereby providing the user data to be transmitted; and at the host computer, executing a host application associated with the client application.

22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of claims 1 to 10.

24. The communication system of the previous embodiment further including the base station.

25. The communication system of the previous 2 embodiments, further including the UE, wherein the UE is configured to communicate with the base station.

26. The communication system of the previous 3 embodiments, wherein:

the processing circuitry of the host computer is configured to execute a host application;

the UE is configured to execute a client application associated with the host application, thereby providing the user data to be received by the host computer.

27. A method implemented in a communication system including a host computer, a base station and a user equipment (UE), the method comprising:

at the host computer, receiving, from the base station, user data originating from a transmission which the base station has received from the UE, wherein the UE performs any of the steps of any of claims 11 to 18.

28. The method of the previous embodiment, further comprising at the base station, receiving the user data from the UE.

29. The method of the previous 2 embodiments, further comprising at the base station, initiating a transmission of the received user data to the host computer.

The invention claimed is:

1. A method performed by a radio access network node in a communication network, the communication network further comprising one or more wireless light communication (LC) network nodes, the method comprising:

obtaining information identifying a wireless LC network node to which a wireless device is connected, wherein obtaining information identifying a wireless LC network node comprises receiving a message from the wireless LC network node comprising an indication of an identity of the wireless device.

2. The method according to claim 1, further comprising determining a location of the wireless device based on the information.

3. The method according to claim 2, wherein the location of the wireless device is determined based further on a geographical location of the wireless LC network node.

4. The method according to claim 1, wherein:

the information is obtained periodically; or the information is obtained in response to a request message transmitted by the radio access network node to the wireless device or the wireless LC network node; or the information is obtained on establishment of a connection between the radio access network node and the wireless device.

5. The method according to claim 1, wherein the radio access network node is configured to implement one or more of:

a wireless cellular radio specification; and a wireless local area network specification.

6. A radio access network node in a communication network, the communication network including one or more wireless light communication (LC) network nodes, the radio access network node comprising:

processing circuitry; and memory comprising executable instructions that, when executed by the processing circuitry, configures the radio access network node to:

obtain information identifying a wireless LC network node to which a wireless device is connected, wherein to obtain the information identifying the wireless LC network node comprises receiving a message from the wireless LC network node comprising an indication of an identity of the wireless device.

7. A method implemented by a wireless light communication (LC) network node in a communication network, the communication network including one or more radio access network nodes with each radio access node forming a respective radio cell, the method comprising:

establishing a wireless LC connection with a wireless device; and transmitting, to a radio access network node, an information message comprising an indication that the wireless device is connected to the wireless LC network node, wherein the indication comprises an identity of the wireless device.

8. The method according to claim 7, wherein the information message further comprises an identity of the wireless LC network node.

9. A wireless light communication (LC) network node in a communication network, the communication network including one or more radio access network nodes with each radio access node forming a respective radio cell, the wireless LC network node comprising:
processing circuitry; and
memory comprising executable instructions that, when executed by the processing circuitry, configures the wireless LC network node to:
establish a wireless LC connection with a wireless device; and
transmit, to a radio access network node, an information message comprising an indication that the wireless device is connected to the wireless LC network node, wherein the indication comprises an identity of the wireless device.

* * * * *